United States Patent [19]

Jonsson

[11] Patent Number: 5,076,818

[45] Date of Patent: Dec. 31, 1991

[54] GAS CLEANING METHODS AND APPARATUS

[76] Inventor: Kjartan A. Jonsson, Sage Rd., Ballston Lake, N.Y. 12019

[21] Appl. No.: 545,383

[22] Filed: Jun. 28, 1990

[51] Int. Cl.⁵ .................... B01D 47/06; B01D 47/16
[52] U.S. Cl. .................................. 55/19; 55/48; 55/49; 55/73; 55/222; 55/223; 55/228; 55/231; 55/241; 55/269
[58] Field of Search ............... 55/18, 19, 48, 49, 73, 55/222, 223, 228, 230–232, 240, 241, 269

[56] References Cited

U.S. PATENT DOCUMENTS

| | | | |
|---|---|---|---|
| 689,246 | 12/1901 | Theisen | 55/231 X |
| 1,866,193 | 7/1932 | Coutant | 55/73 X |
| 2,698,745 | 1/1955 | Buocher | 55/230 X |
| 3,522,000 | 7/1970 | Kinney | 55/73 X |
| 3,839,849 | 10/1974 | Maniya | 55/73 X |
| 4,047,891 | 9/1977 | Schuetz | 55/18 X |
| 4,078,390 | 3/1978 | Duvall | 55/73 X |
| 4,189,309 | 2/1980 | Hoekstra | 55/48 X |
| 4,263,021 | 4/1981 | Downs et al. | 55/73 |
| 4,323,371 | 4/1982 | Ritvanen | 55/19 |
| 4,419,331 | 12/1983 | Motalvo | 55/73 X |
| 4,426,210 | 1/1984 | Drawert et al. | 55/222 X |
| 4,589,889 | 5/1986 | Spencer | 55/48 |
| 4,670,221 | 6/1987 | Marnet et al. | 55/18 X |
| 4,941,898 | 7/1990 | Kimura | 55/240 X |
| 4,957,519 | 9/1990 | Chen | 55/233 |

FOREIGN PATENT DOCUMENTS

| | | | |
|---|---|---|---|
| 3419735 | 10/1985 | Fed. Rep. of Germany | 55/73 |
| 59-160519 | 9/1984 | Japan | 55/19 |
| 1087161 | 4/1984 | U.S.S.R. | 55/230 |

*Primary Examiner*—Robert Spitzer
*Attorney, Agent, or Firm*—Schmeiser, Morelle & Watts

[57] ABSTRACT

Particulates, oxides of nitrogen and sulfur and other air-polluting burdens are separated and removed from gas streams to be discharged to the atmosphere in compliance with the strictest regulations by precooling, scrubbing and neutralizing and cleaning operations conducted sequentially in apparatus including an array of air purification wheels of novel design and function on which water is centrifugally flowed continuously in contact with air passing through the wheel array in travel toward the ultimate discharge point.

33 Claims, 20 Drawing Sheets

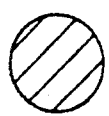 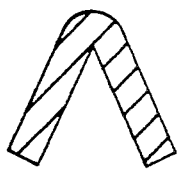 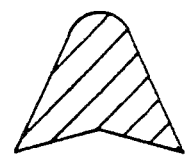
FIGURE 11A  FIGURE 11B  FIGURE 11C
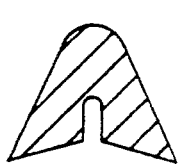 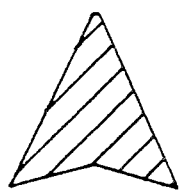
FIGURE 11D  FIGURE 11E
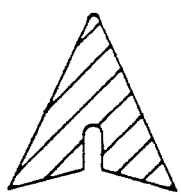 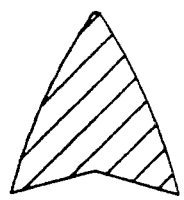 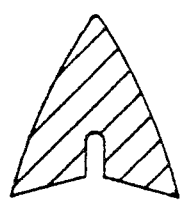
FIGURE 11F  FIGURE 11G  FIGURE 11H
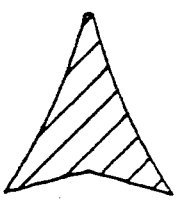 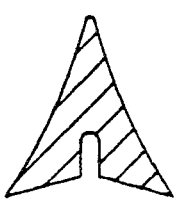
FIGURE 11K  FIGURE 11L

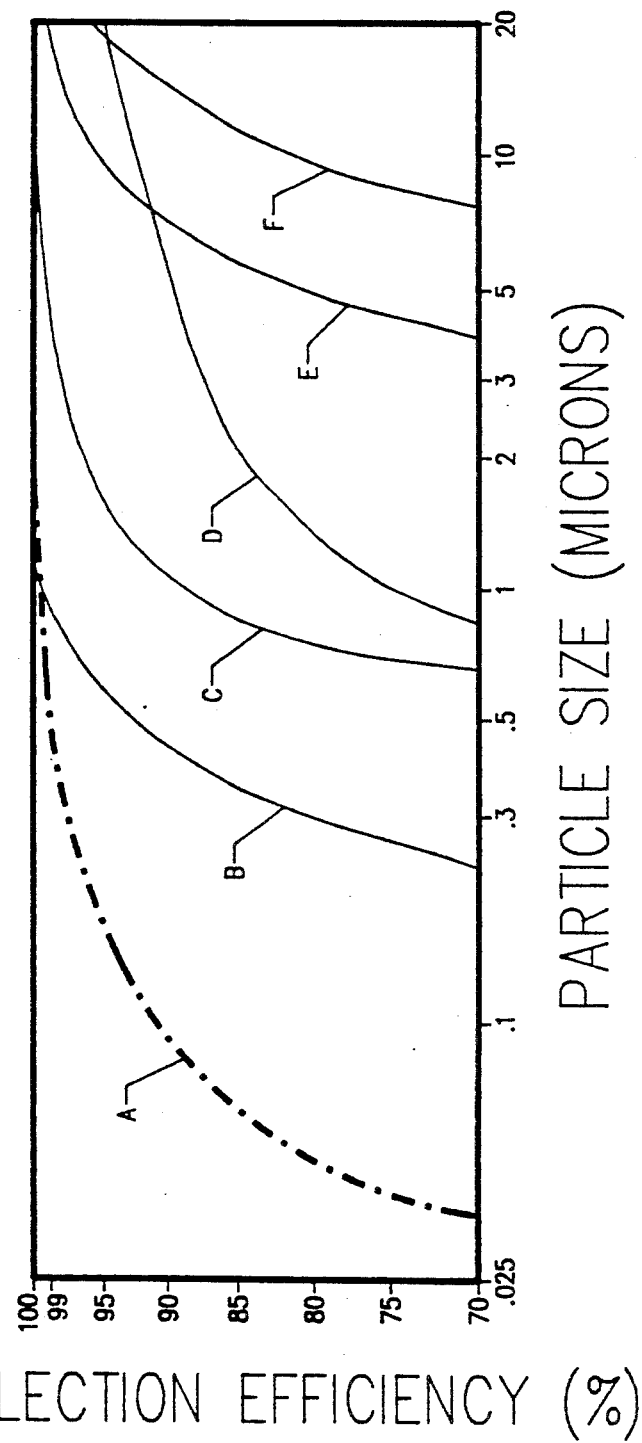

GAS CLEANING METHODS AND APPARATUS

FIELD OF THE INVENTION

The present invention relates generally to the art of cleaning flowing gases, and is more particularly concerned with novel methods for separating and removing particulate material, moisture and oxides of nitrogen and sulphur from power generation combustion gases and industrial effluent gases in general, and with new apparatus implementing those methods.

BACKGROUND OF THE INVENTION

Increasing public environmental awareness and concern about the consequences of atmospheric pollution has stimulated determined efforts to find an effective and economical way to clean effluent gases of industrial operations and electric power generating plants. A resulting prior art device which has served well is a separating apparatus comprising a plurality of air purification wheels disposed axially in series and having thin, rod-like spokes. The gases to be cleaned are led axially through the separating apparatus as the wheels are rotated and a water spray is delivered in contact with them. The water spray collecting on the spokes continuously during operation flows under the action of centrifugal force as the wheels are rotated, carrying solid material entrained in the water and gaseous components absorbed in the water. The resulting mixture is continuously discharged from the separating apparatus, running off the ends of the spokes into a container where it is collected for transfer away from the apparatus and the gas duct or stack in which the apparatus is installed.

This apparatus is to my knowledge the most efficient and effective heretofore available in the art for the purpose. It also has an economic advantage, initial cost comparing favorably with that of alternative apparatus in general use and operating and maintenance total cost being relatively very low.

SUMMARY OF THE INVENTION

By virtue of the present invention, based upon the new concepts set forth below, substantial improvement in the performance of prior art separating apparatus can be made, particularly in terms of the effectiveness of cleaning and ridding waste gases of solid, gaseous and liquid burdens so that almost totally clean air is ultimately discharged from an industrial plant or a power generating facility. Moreover, this important new result is obtainable in accordance with this invention without economic penalty, without restricting power generation or plant production capacity, and regardless of the constituency of such gases.

This invention additionally affords important new energy recovery opportunity using either the separating apparatus of this invention or that of the prior art. Additionally, in a preferred embodiment of this invention acidity of gas discharged by whichever gas cleaning apparatus is employed can be automatically neutralized to the extent desired.

According to one of the new concepts of this invention gas precooler apparatus is provided in a gas discharge system including gas cleaning apparatus, in precooler being upstream of the cleaning apparatus and operating in heat exchange mode with a suitable fluid such as air or water flowing in contact with the gas flue.

Still another such concept having both method and apparatus aspects is the establishment and maintenance in the present novel gas cleaning apparatus of a water reservoir. By providing a bulk water source centrally within the circumference of the apparatus, it is possible to discharge accumulated water as a continuous film flowing radially across the air purification wheels and along the lengths of the spokes of the individual wheels as they are rotated. This continuous uniform distribution of water film on the spokes insures maximum effective contact between the stack gas and the cleansing water at all times during the operation of the separator.

Another concept on which this invention is based is the provision of a water retentive surface on the wheel spokes. This further insures the presence of water across the entire length of the individual spokes during operation and also insures regular and even flow under the centrifugal action, which might otherwise tend to irregularity and surges or spurts and loss of effectiveness of the cleansing action. Teflon $^R$ plastic coating on the spokes, especially on the parts of the spokes which are designed for or conducive to collection and water flow, serves this purpose to advantage, the natural finish of the coating being matte-like. A similar surface can also be provided in other ways in accordance with this invention, as described in detail below.

Another new concept involved in preferred embodiments of this invention is the use of variable speed electric motors or hydraulic motors which can minimize horsepower requirements and which in the case of electric motors can offer field adjustability for the service required. The hydraulic motor has the special advantage, on the other hand, of eliminating the necessity for cooling when the gases to be cleaned are of relatively high temperature.

According to another novel concept of mine, water or equivalent liquid used for heat exchange purposes is recirculated without treatment while that used in direct contact with the gas for cleaning purposes is collected as it is discharged and then drained, filtered and thereafter sprayed again into the gas stream. In preferred practice such recirculating water is chemically treated, the pH being monitored and alkaline reagent being automatically introduced to neutralize acidic constituents in the gas.

Briefly described, the method of this invention comprises the steps of flowing gas to be cleaned through an array of rotating air purification wheels in a gas flow duct while delivering a water spray into contact with the wheels and establishing and maintaining a liquid reservoir in the wheel array, and substantially uniformly continuously discharging accumulated liquid from the reservoir radially outwardly across the rotating wheels.

Likewise described in broad general terms, the novel apparatus of this invention comprises separating apparatus as described immediately above in which there is liquid spray delivery means including a hollow drive shaft fixed to air purification wheel hubs each of which has a depressed central portion in its upper side to receive and contain and discharge liquid to the spokes of its wheel.

BRIEF DESCRIPTION OF THE DRAWINGS

Those skilled in the art will gain a further and better understanding of the present invention from the following detailed description of this invention taken together with the drawings accompanying and forming a part of this specification, in which:

FIGS. 11A–L are cross-sectional views of ten different spokes of air purification wheels of this invention;

FIG. 12 is a chart on which collection efficiency in percentage is plotted against particle size in microns, the several curves depicting gas cleaning performance data of a variety of separating devices, including the present invention apparatus of FIG. 1 above;

DETAILED DESCRIPTION OF THE INVENTION

Figure 1:
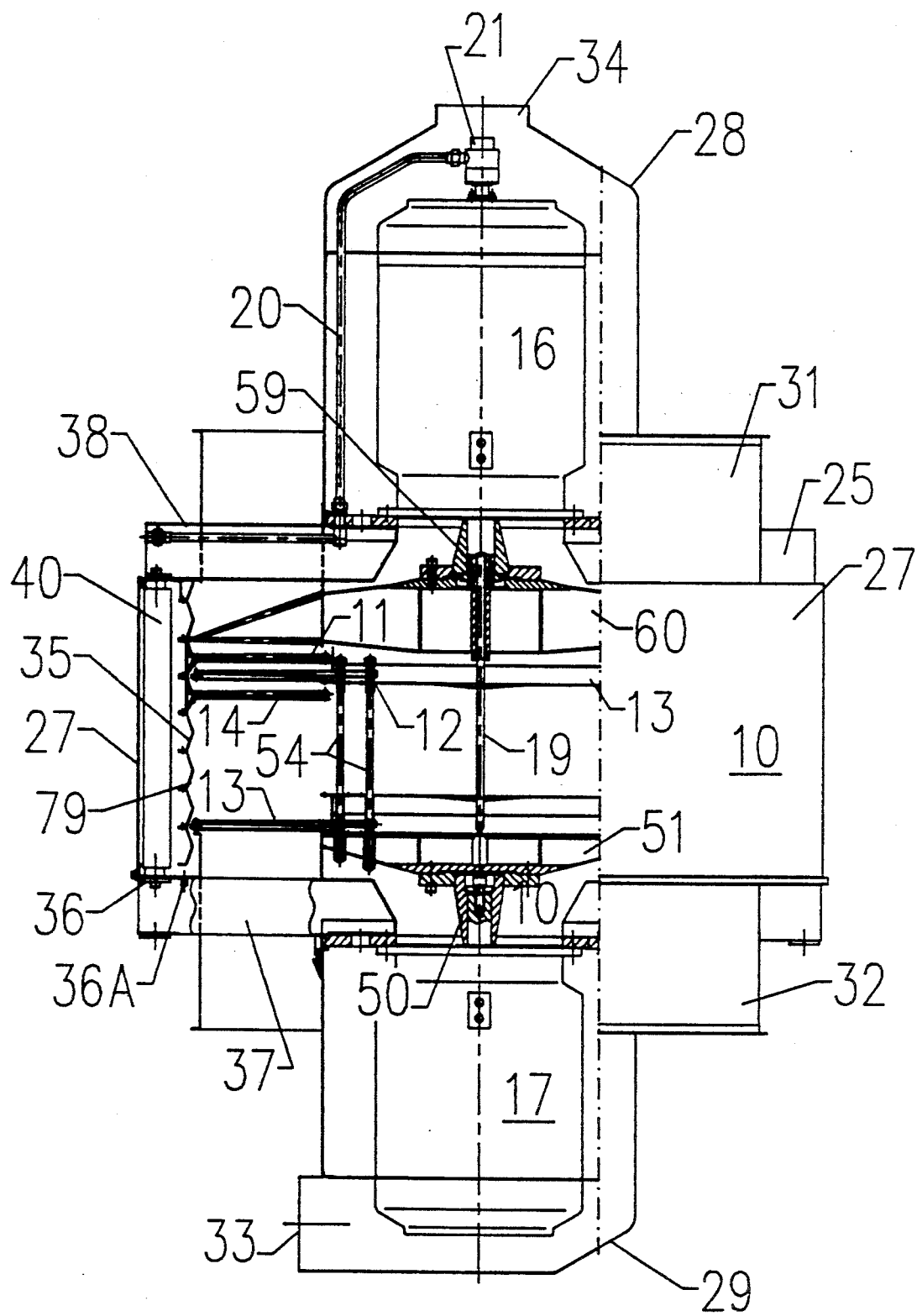
FIG. 1 is an elevational view, partly in section, of gas cleaning apparatus of this invention, parts being broken away for clarity.

A presently preferred embodiment of gas cleaning apparatus of this invention is illustrated in FIG. 1 where novel apparatus 10 is shown positioned for use in cleaning stack gases, being mounted vertically in a gas duct such as a smoke stack (not shown) to receive gases flowing upwardly and directed through an array of assemblies 11 and 12 of air purification wheels 13 and 14, respectively rotatable on an axis parallel to the direction of gas flow upwardly through the apparatus. Electric motors 16 and 17 disposed above and below wheel assemblies 11 and 12 serve to drive wheels 13 in counterclockwise rotation and wheels 14 in clockwise rotation. Water is delivered into the wheel array through pipe 19 disposed axially in the apparatus and having openings at intervals along its length for water spray release within the array. Pipe 19 is connected to a source of water under pressure outside the apparatus (not shown) by water supply pipe 20 and water head apparatus 21 fitted on top of motor 16.

Housing assembly 25 of apparatus 10 includes a cylindrical perimeter container 27 which surrounds and encloses wheel array 12, motor guards 28 and 29 enclosing motors 16 and 17, respectively, and upper sleeve 31 and louver sleeve 32 which receive the lower end of motor guard 28 and the upper end of motor guard 29 respectively. Sleeves 31 and 32 are partially telescoped in perimeter container 27 and provide an intake port 33 and exhaust port 34 for motor cooling air flow upwardly through apparatus 10.

An annular collection chamber 35 surrounds the wheel array to receive water and wet mixtures thrown from the wheels of assemblies 11 and 12 as they are rapidly rotated during operation. Chamber 35 is defined in part by perimeter container 27 and bottom unit 36 from which accumulations of wheel discharge materials may be removed continuously or at intervals through drain 36A.

Motors 16 and 17 are mounted in opposed coaxial position and supported along with associated elements as a unit by housing 25. Thus, with motor guard 29 serving as a base, louver support 37 mounted thereon carries louver sleeve 32 and perimeter container 27. Upper support 38, which is secured to carrying supports 40 in the form of a plurality of column ar rods affixed to louver support 37, carries upper sleeve 31, motor guard 28 and motor 16.

Air purification wheels 13 of assembly 11 are driven in rotation by motor 17 through louver motor flange 50, louver wheel 51 and stag bolts 54 tying wheels 13 to louver wheel 51 and supporting them in spaced relation.

Air purification wheels 14 of assembly 12 are supported and driven as a unit in similar manner by motor 16 through motor flange 59, main support wheel 60 and a suspension system described in detail below in reference to FIGS. 5 and 6A and B.

Figure 2:
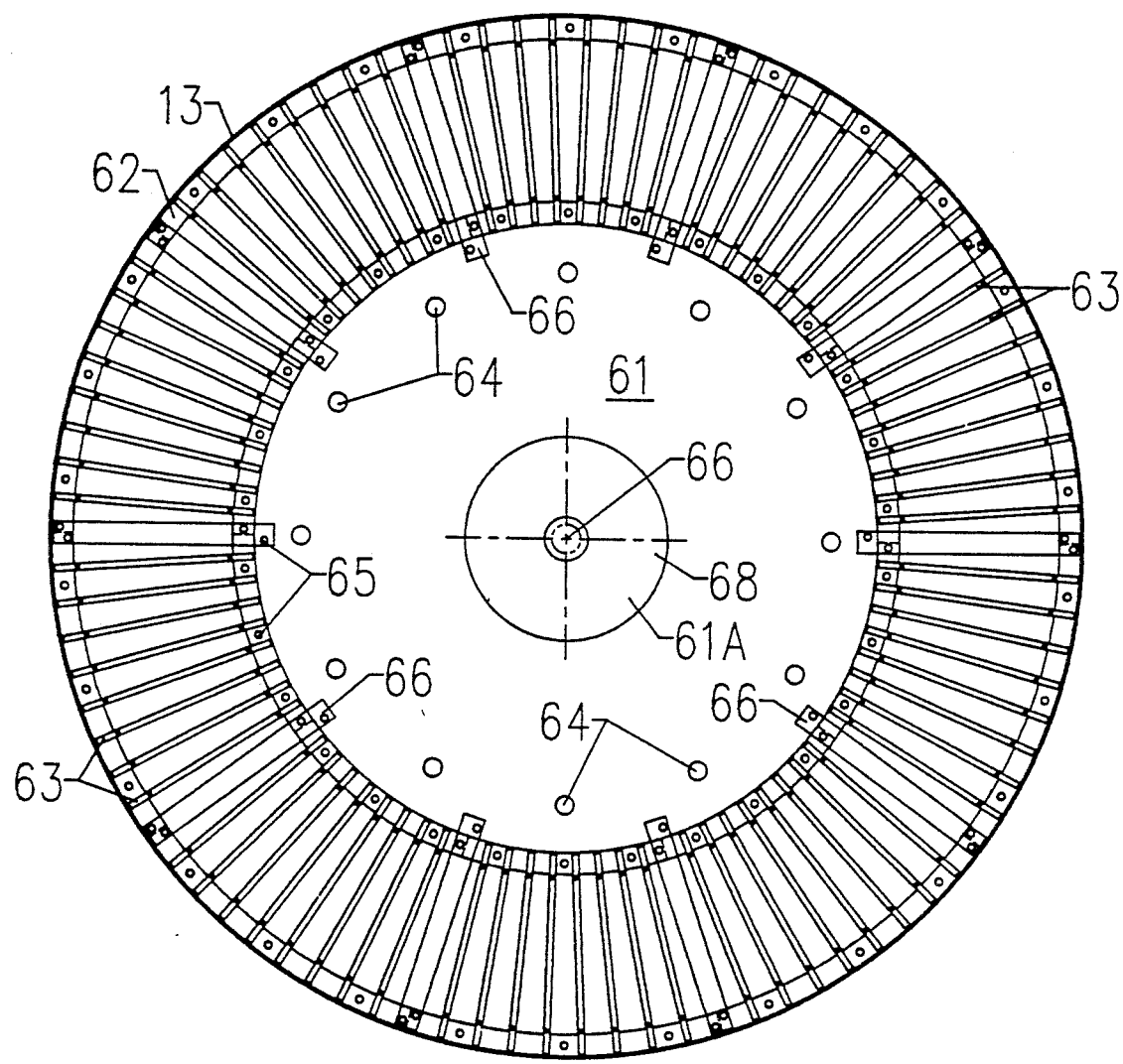
FIG. 2 is a top plan of one type of air purification wheel of the apparatus of FIG. 1.
Figure 3A:
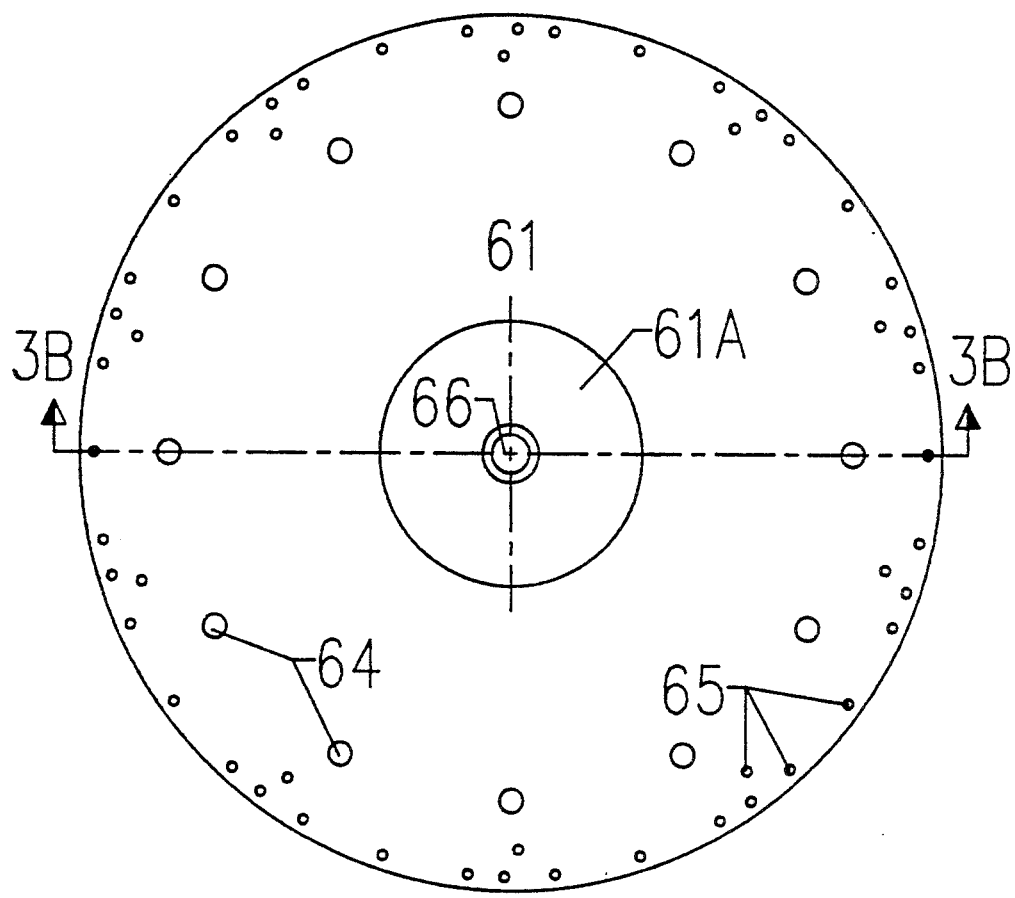
FIG. 3A is a top plan view of the hub of the wheel of FIG. 2.
Figure 3B:
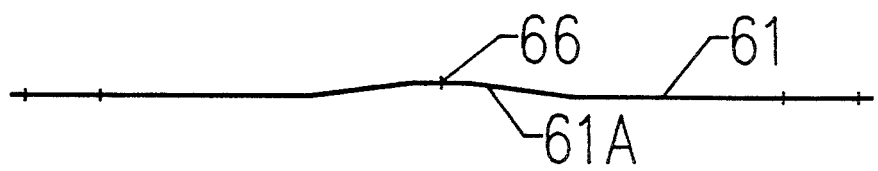
FIG. 3B is a sectional view of the hub taken on line 3—3 of FIG. 3A.
Figure 4A:
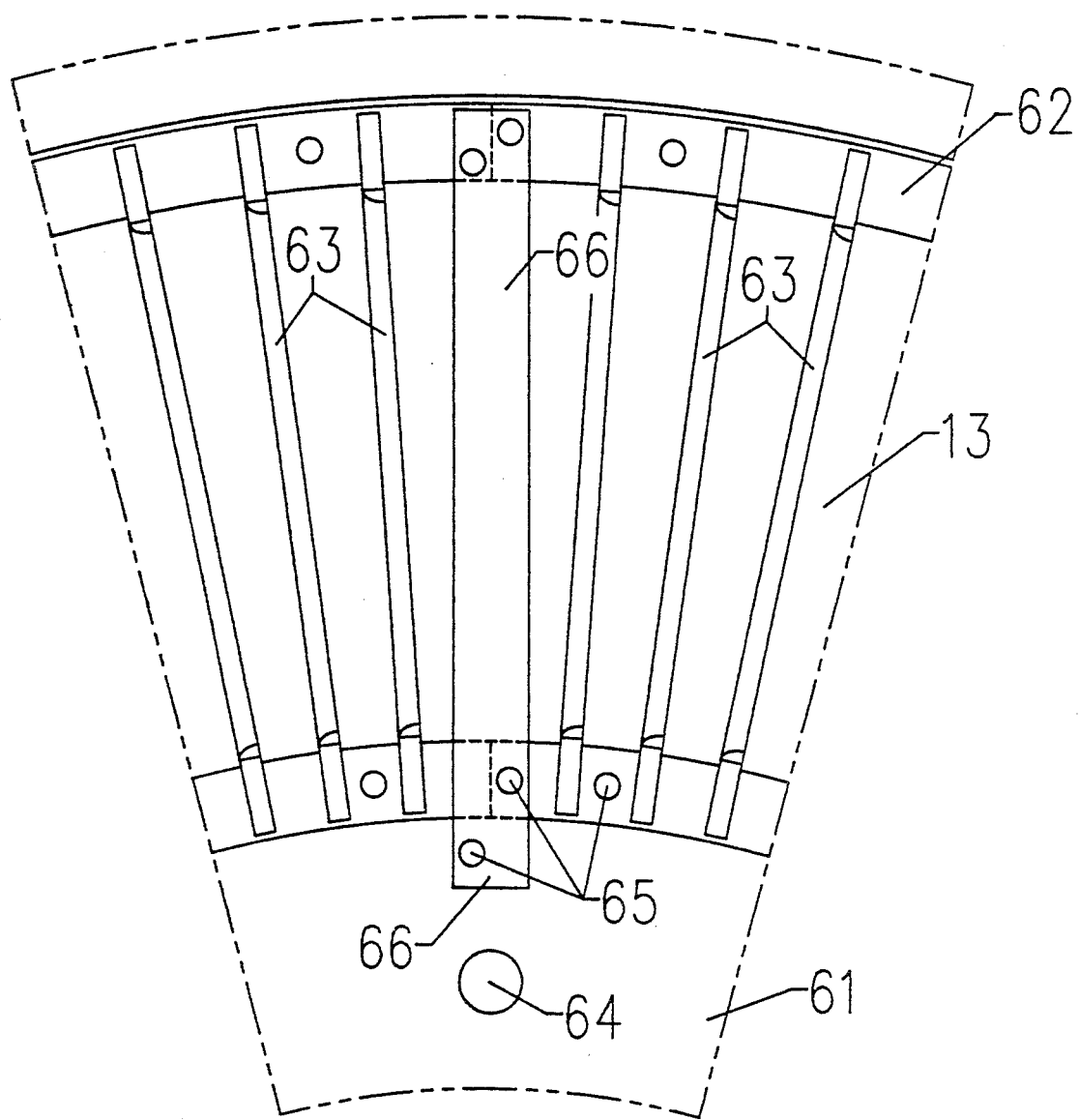
FIG. 4A is an enlarged top plan view of a segment of the wheel of FIG. 2.
Figure 4B:
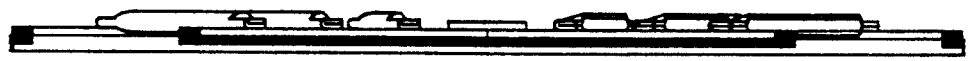
FIG. 4B is a sectional view taken on line 4—4 of FIG. 4A.

As shown in FIG. 2, wheel 13 comprises a plate or disc-like hub 61, an outer rim 62 and a plurality of radial spokes 63 rigidly secured at their ends to the hub and the rim and spaced substantially uniformly and relatively closely around the wheel circumference. Apertures 64 in hub 61 are provided to receive stag bolts 54 tying wheels 13 of assembly 11 together for rotation as the apparatus is operated. Hub 61 also is provided with a plurality of smaller diameter openings 65 near the periphery of the hub for purposes of securing the spoke assembly to the hub. In addition, hub 61 has a central aperture 66A to receive water pipe 19 which extends downwardly from the top of the apparatus to deliver water to the wheel array and each of the wheels of assemblies 11 and 12. In the area surrounding the central aperture hub 61 is depressed to provide, as shown in FIG. 3B, a shallow reservoir 61A for accumulation of water delivered by pipe 19 as spray. Outer rim 62 of wheel 13 is similarly secured to the spokes as shown in FIG. 4A and at intervals around the circumference of the wheel structural elements 66 are provided to maintain the integrity of the wheel in transportation storage, installation and operation. The relationship between the spokes and the hub and the outer ring components of the wheel are illustrated to advantage in FIG. 4B.

Figure 5:
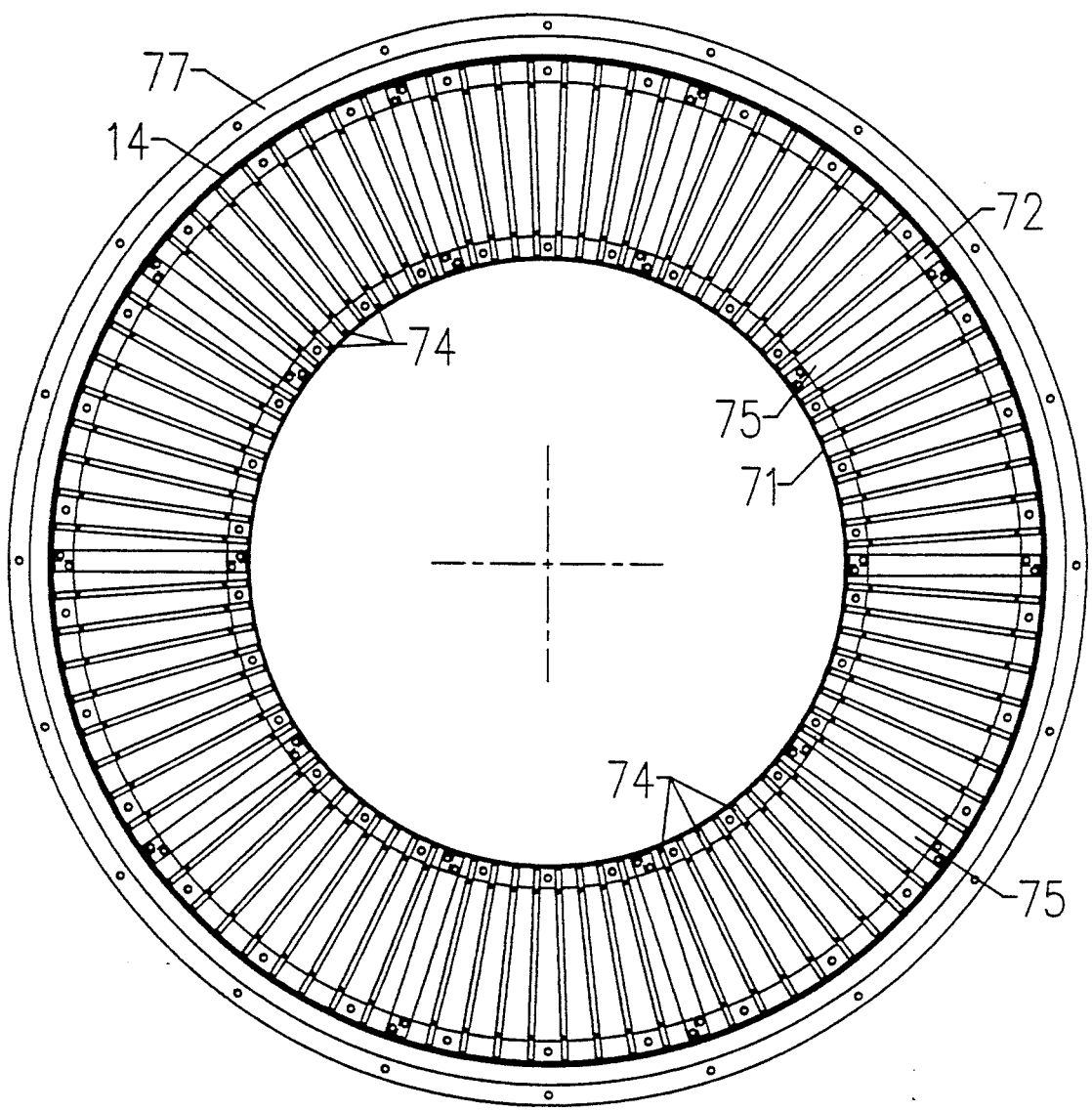
FIG. 5 is a top plan view of another type of air purification wheel of FIG. 1 apparatus.
Figure 6A:
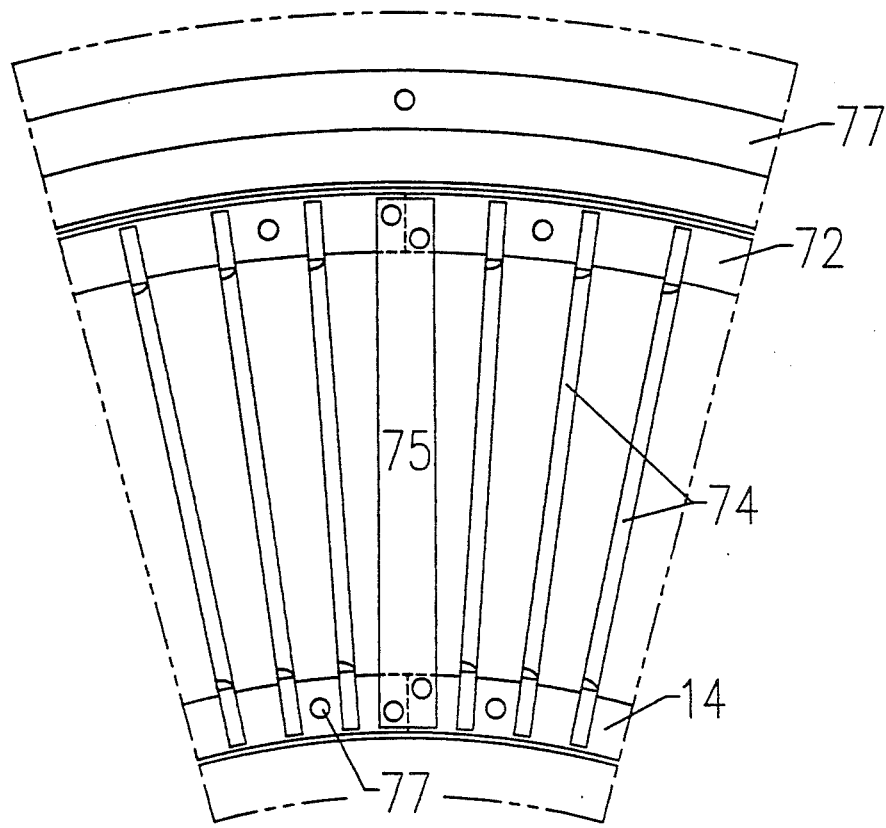
FIG. 6A is an enlarged top plan view of a segment of the wheel of FIG. 5.
Figures 6B, 6C:
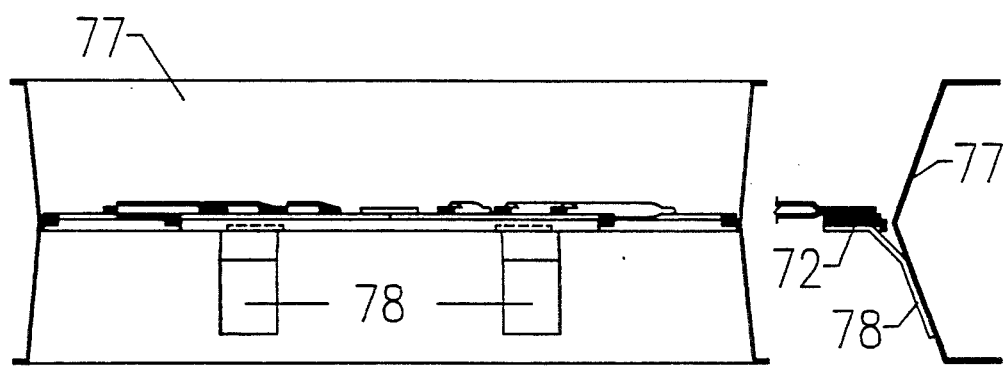
FIG. 6B is an elevational view of the wheel segment of FIG. 6A.
FIG. 6C is a fragmentary, vertical sectional view of the wheel segment of FIG. 6A taken on line 6—6 of FIG. 6B.

Wheel 14 illustrated in FIG. 5, unlike wheel 13, has no hub but instead it has an inner ring 71 and an outer ring 72, spokes 74 of the wheel being secured at their ends to those rings and disposed radially around the circumference of the wheel in relatively closely spaced relation, as in the case of wheel 13. Structural elements 75, like structural elements 66, are attached to both inner ring 71 and outer ring 72 and serve in like manner to maintain the shape and the integrity of wheel 14 in handling and use. Unlike wheel 13, again, wheel 14 is carried and driven by a suspension system attached to outer ring 72. In detail, the suspension system comprises a channel-shaped band 77 fitted with a flanged bracket 78 to which ring 72 is tack welded, as shown to best advantage in FIGS. 6A and 6B. In assembly 12 annular bands 77, which themselves are secured together as indicated in FIG. 1, provide a wall 79 against which material is discharged from the wheels 13 and 14 as the machine is operated. Wall 79 is secured to the periphery of main support wheel 60 for rotation therewith and serves in effect as the inner wall of chamber 35.

Figure 7A:
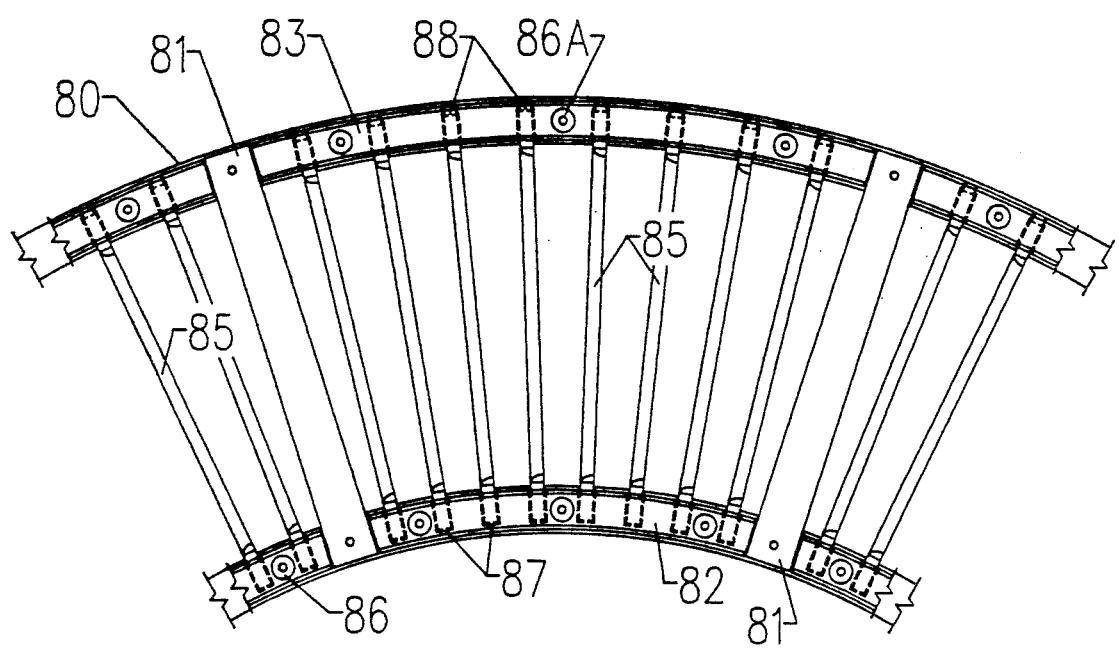
FIG. 7A is a view like that of FIG. 6A of a preferred air purification wheel of the invention.
Figure 7B:
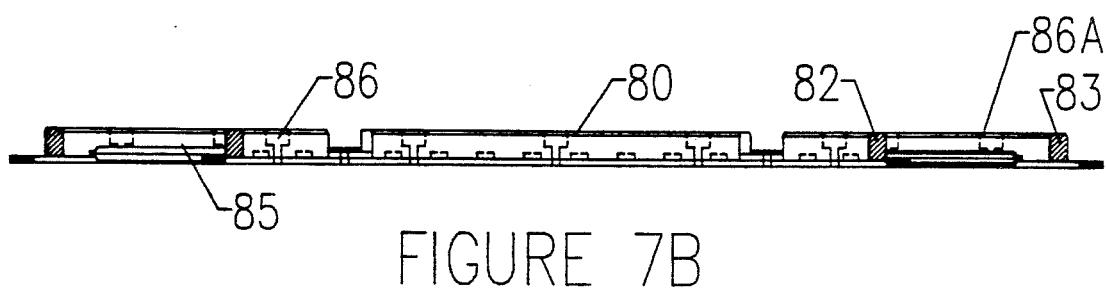
FIG. 7B is a sectional view of the wheel segment of FIG. 7A taken on line 7B—7B of FIG. 7A.

A presently preferred form of air purification wheel 80 of the wheel 14 type shown in FIG. 7A is of relatively light weight construction, being made of suitable plastic material such as polycarbonate resin instead of stainless steel as in the case of the wheel of FIG. 5. The several component parts of the wheel 80 are secured together by screws which tie the support elements 81 to inner and outer rings 82 and 83, while the ends of spokes 85 are received in recesses 87 and 88 in the rings where the spoke ends may either be loosely fitted or adhesively bonded in place. As shown in FIG. 7B, inner and outer rings 82 and 83 are of substantial vertical dimension somewhat greater than the cross sectional dimension of spokes 85 and are provided with openings 86 and 86A, respectively, to receive bolt fasteners.

Figure 7C:
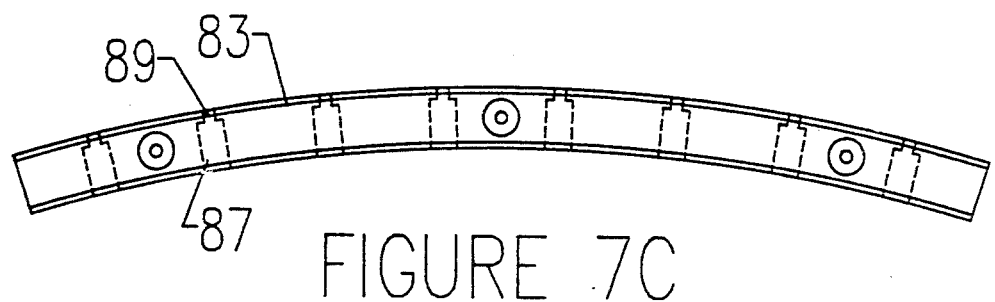
FIG. 7C is a top plan view of the outer ring of the wheel segment of FIG. 7A.
Figure 7D:
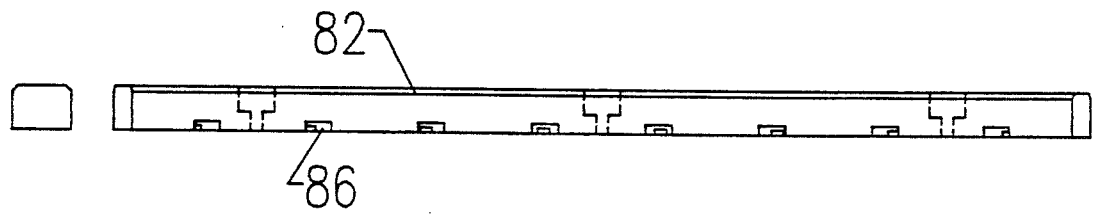
FIG. 7D is an elevational view of the outer ring segment of FIG. 7C.
Figure 7E:
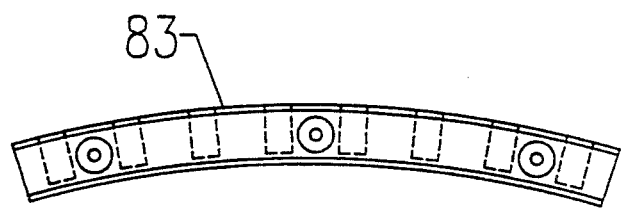
FIG. 7E is a view like that of FIG. 7C of the inner ring of the wheel segment of FIG. 7A.
Figure 7F:
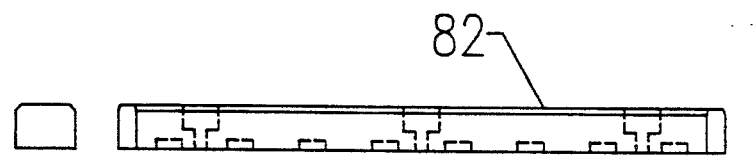
FIG. 7F is an elevational view of the ring of FIG. 7E.

In FIGS. 7C, D, E and F portions of rings 82 and 83 are shown in enlarged form to better illustrate the relationships between spokes 85 and inner and outer rings 82 and 83, apertures 89 being provided in ring 83 for receiving discharge from the ends of spokes 85 as the machine is operated.

Figure 8A:
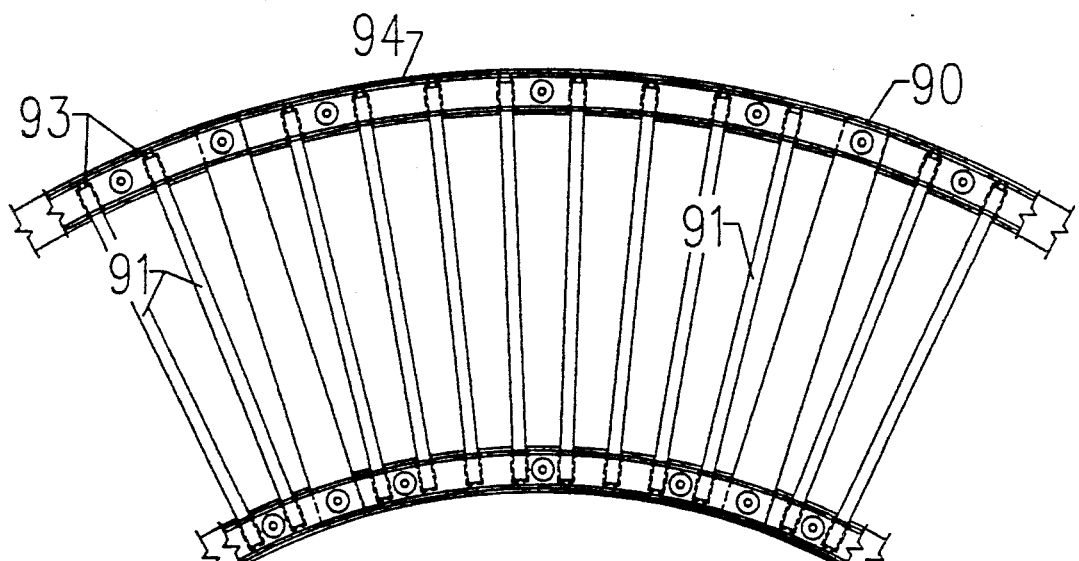
FIG. 8A is a view like that of FIG. 6A of a segment of another air purification wheel of this invention.
Figure 8B:
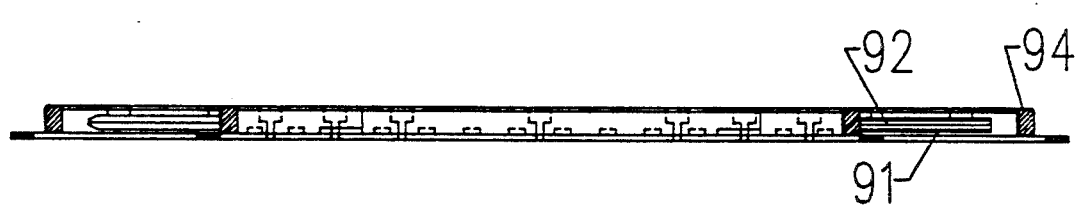
FIG. 8B is an elevational view of the segment of FIG. 8A.
Figure 8C:
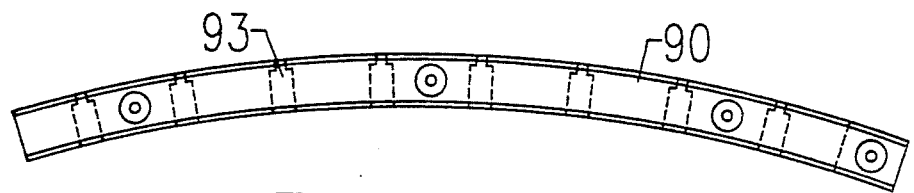
FIG. 8C is a top plan view of the outer ring of the segment of FIG. 8B.
Figure 8D:
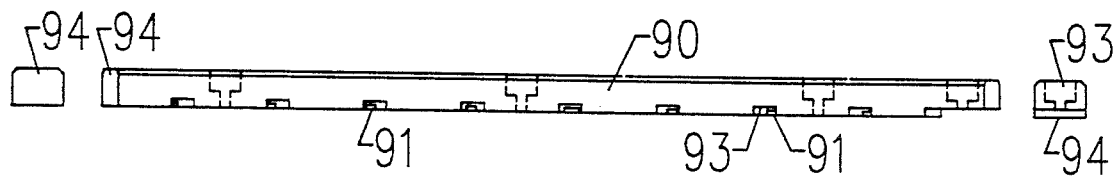
FIG. 8D is an elevational view of the FIG. 8C ring segment.
Figure 8E:
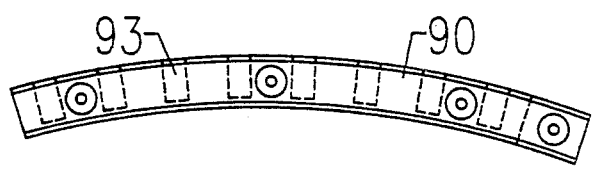
FIG. 8E is a top plan view of the inner ring of the segment of FIG. 8B.
Figure 8F:
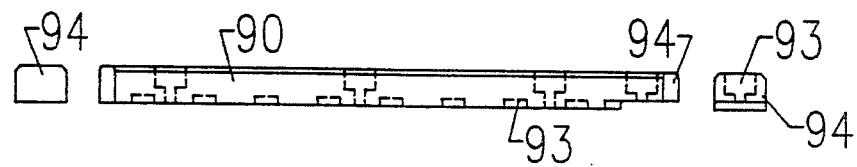
FIG. 8F is an elevational view of the ring segment of FIG. 8E.
Figure 9:
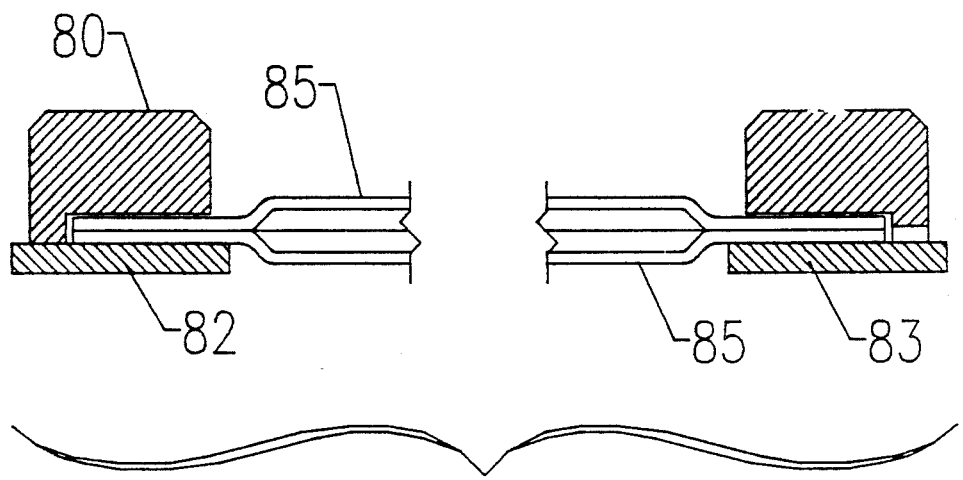
FIG. 9 is an enlarged fragmentary sectional view taken on line 9—9 of FIG. 7A.
Figure 10:
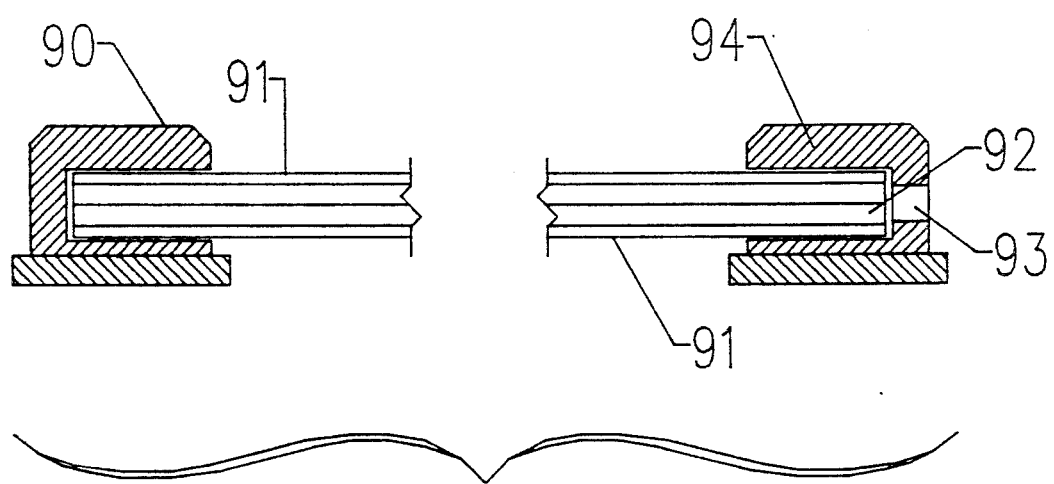
FIG. 10 is a view like that of FIG. 9 taken on line 10—10 of FIG. 8A.

Still another version of the wheel 14 type is shown in FIGS. 8A and 8B representing another preferred embodiment of the present invention. This particular wheel 90 has spokes 91 of V-shape cross section but, unlike spokes 74, are open at their outer ends 92 and positioned to discharge from the outer ends directly through apertures 93 in outer ring 94 of wheel 90 in register therewith. The relationship is seen to better advantage in FIGS. 8C, D, E and F which are enlarged elevational views of segments of the inner and outer rings of wheel 90.

As indicated in the drawings, particularly FIG. 11, the spokes of the air purification wheels of this invention are either round in cross section (11A) or of the general form and shape of an air foil (11B-11L) with a reentrant, axially (i.e. longitudinally) extending cavity of essentially uniform cross sectional size running full length. The surfaces of the spokes are preferrably not smooth or polished, but are rough or matte-like for water retention effect. This feature of the invention substantially enhances the gas cleaning effect of the apparatus by ensuring the maximum gas-moisture film contact in the gas cleaning operation.

All the spokes in each wheel 13 and 14 are of the 11B type and are oriented in the same way, that is, spokes are positioned slightly tilted with their lower sides substantially parallel to the plane of their wheel. The airfoil effect thereby obtained is reflected in an improvement in operating efficiency of the apparatus. The spokes of wheel assembly 11 are directed counter to those of wheel assembly 12 because of their opposite directions of rotation.

As also indicated above, the component parts of the apparatus of this invention, in particular the air purification wheels, may be fabricated of materials of choice which will withstand the service environment. Hence, metals and alloys such as aluminum and stainless steel are generally suitable and in some situations plastic or even ceramic components can be used to substantial advantage. My present preference is for stainless steel for most of the structural components and for Teflon $^T$ plastic coatings on the wheel spokes and for plastic wheel components including the rings the hubs and associated elements. The desired water retentive surface which is characteristic of Teflon plastic coats can be provided by shot peening the metal spokes in the course of their production. Alternatively, one may achieve the same unique surface result and in addition gain even greater high temperature corrosion resistance by coating the metal surface of the spokes with a ceramic material such as Pyroceram $^T$ ceramic, silicon carbide or the like.

As shown in the chart of FIG. 12, the apparatus of this invention shown in FIG. 1 is much superior to other gas cleaning devices in separating and removing particulate material. Thus curve A depicts experimental data gathered in testing apparatus 10 while curves B, C, D, E and F represent data obtained under the same test conditions involving, respectively, an 80-inch venturi, a 30-inch venturi, an electrostatic precipitator, wire mesh and a high efficiency cyclone separator.

The data set out in the following tables also attest to the special merits of apparatus of this invention, particularly apparatus 10 of FIG. 1. The testing program resulting in the data set out in Tables I, II and III below was performed on flue gas breeching from a hospital waste incineration sytem at average flue gas flow rate of 4,500 ACFM at 425° F. at the stack test port location immediately downstream from the tie-in for the test sample port of the apparatus of this invention. The program additionally involved simultaneously testing of particulate matter and gaseous compounds at the inlet and outlet of the invention apparatus. Flue gas was cooled to 115° to 140° F. by flue-to-air heat exchange prior to delivery into the invention apparatus.

A total of three particle size test runs were performed in which sampling was in accordance with USEPA Method 17. $SO_2$ and $H_2SO_4$ sampling was performed during one of the particle size test runs (Run No. 1) utilizing a modified USEPA Method 8 sampling train. HCl sampling was performed by replacing the distilled deionized water typically found in the USPA Method 5 train with 0.1N caustic soda. Testing for nitrogen dioxide was performed in accordance with USEPA Method 7.

During the three days of tests, just the standard operating practice of the incineration system and the energy recovery boiler took place. The waste burned during the three days of tests was medical waste and common waste as coming from the hospital. Further, during the three days of test, the operation of the incineration system and the energy recovery boiler was performed by the same operators as normally operate the incineration system and energy recovery boiler.

TABLE I

PARTICULATE MATTER EMISSIONS AND COLLECTION EFFICIENCY SUMMARY

| Test Run | (@ 7% $O_2$) Gr/DSCF | Lbs/Hr | (@ 7% $O_2$) Gr/DSCF | Lbs/Hr | *Percent Collection Efficiency |
|---|---|---|---|---|---|
| 1 | 0.2119 | 0.7490 | 0.0188 | 0.0580 | 92.3 |
| 2 | 0.1220 | 0.3710 | 0.0091 | 0.0250 | 93.3 |
| 3 | 0.1295 | 0.4330 | 0.0094 | 0.0280 | 93.5 |
| Avg. | 0.1304 | 0.4077 | 0.0096 | 0.0270 | 93.4 |

**Summary Particulate Matter Size Collection *Efficiency (%)**

| Particulate Matter Size Range (In Microns) | Test Run Number 1 | 2 | 3 | Avg. |
|---|---|---|---|---|
| >9.6 | 97.96 | 91.63 | 88.81 | 92.80 |
| 6.0 | 90.51 | 89.05 | 83.21 | 87.59 |
| 4.1 | 96.64 | 92.79 | 84.89 | 91.44 |
| 2.8 | 95.66 | 91.32 | 97.38 | 94.79 |
| 1.7 | 93.72 | 93.96 | 96.25 | 94.64 |
| 0.85 | 91.39 | 94.60 | 97.27 | 94.42 |
| 0.54 | 90.25 | 97.51 | 94.66 | 94.14 |
| 0.36 | 92.09 | 97.15 | 92.39 | 93.87 |
| 0–0.36 | 89.12 | 90.91 | 89.99 | 90.01 |

*Collection Eff. = 100 * $\frac{\text{Inlet (lbs/hr)} - \text{Outlet (lb/hr)}}{\text{Inlet (lb/hr)}}$

TABLE II

SUMMARY OF GASEOUS SPECIES TEST RESULTS

| Test Run No. | Rotor-Filter Inlet PPM @ 7% $O_2$ | lbs/hr | Rotor-Filter Outlet PPM @ 7% $O_2$ | lbs/hr | *Percent Collection Efficiency |
|---|---|---|---|---|---|
| *Hydrogen Chloride, HCl* | | | | | |
| 1 | 160 | 0.381 | 37 | 0.078 | 79.5 |
| 2 | 153 | 0.337 | 34 | 0.066 | 80.4 |
| 3 | 207 | 0.412 | 56 | 0.104 | 74.8 |
| *Sulfuric Acid Mist ($H_2SO_4$) & Sulfur Dioxide ($SO_2$)* | | | | | |
| 4 | 38.3/153.3 | 0.212/0.549 | 2.4/7.2 | .020/.029 | 90.6/94.7 |
| *Nitrogen Dioxide, $NO_2$* | | | | | |
| Performed Prior to Test Run 5 | 126.9 | 0.34 | 61.8 | 0.18 | 47.1 |
| *Carbon Monoxide, CO* | | | | | |
| 1 | 31.5 | | 28.4 | | |
| 2 | 42.5 | | 39.4 | | |
| 3 | 20.3 | | 17.9 | | |
| 4 | 81.8 | | 79.8 | | |
| 5 | <11.5 | | <11.5 | | |
| 6 | 121.6 | | 124.0 | | |

*Based on inlet vs outlet concentration in lbs/hr

TABLE III

SUMMARY OF TEST OPERATING PROCEDURES

| Test Run # | Rotor-Filter Inlet Duct Flow Rate (SCFM) | Waste Processed (lbs/hr) |
|---|---|---|
| 1 | 856 | 823 |
| 2 | 779 | 845 |
| 3 | 739 | 848 |
| 4 | 845 | 806 |
| 5 | 850 | 875 |
| 6 | 854 | 816 |

| Test Run # | Rotor Filter Internal Rotor Speed (Hz) | Pressure Drop Inlet/Outlet In. of $H_2O$ |
|---|---|---|
| 1 | 50 | 2.6 |
| 2 | 50 | 2.4 |
| 3 | 60 | 3.0 |
| 4 | 50 | 2.9 |
| 5 | 60 | 2.8 |
| 6 | 55 | 2.8 |

Figure 13:
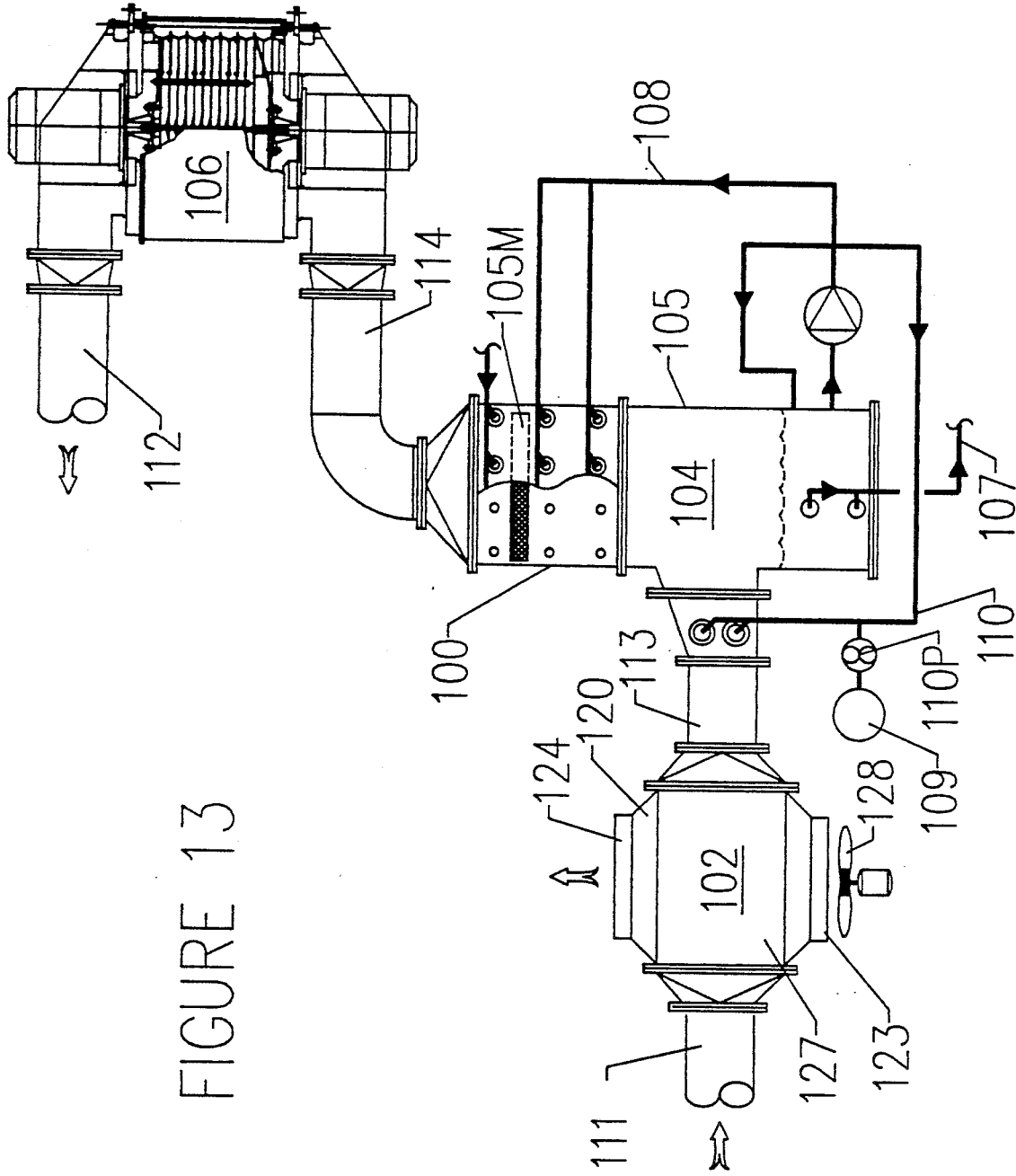
FIG. 13 is a schematic view of gas discharge system of this invention including gas precooler apparatus, particulate material separator apparatus and gas cleaning apparatus downstream from the separator and the precooler apparatus.

In the preferred embodiment of the gas discharge system 100 of this invention illustrated in FIG. 13, waste gas from a source such as a combustion device (not shown) is flowed through precooler apparatus 102, scrubber apparatus 104 and cleaning apparatus 106 and then vented to the atmosphere through a stack (not shown).

A flue 110 comprises intake and exhaust segments 111 and 112, respectively, and segment 113 connecting precooler apparatus 102 to scrubber 104 and segment 114 connecting gas cleaner 106 to scrubber 104. Thus, flue 110 with precooler 102 and scrubber 104 and cleaner 106 provide a waste gas exhaust line serving a waste gas source to vent waste gas cooled and cleaned to the atmosphere directly or through a stack, as desired.

Gas cleaning apparatus 106 is preferably that of this invention shown in FIG. 1 and described in detail above. It will be understood, however, that other gas cleaning apparatus may be used, such as that of the prior art described above.

Precooler apparatus 102 comprises a generally cylindrical shell 120 having inlet and outlet ports at its ends to receive and discharge waste gas flowing in through flue segment 111 and out through flue segment 113. Additionally, shell 120 has ports 123 and 124 in its side wall to receive and discharge a heat exchange fluid flowing through the shell. An indirect heat exchange conduit 127 is coaxially mounted in the shell to contain waste gas in flow through apparatus 102 as cooling air is blown by fan 128 through shell 120 in heat exchange contact with the exterior surface of conduit 127. For purposes of serving the function of the precooler in cooling waste gas to the desired temperature for subsequent treatment in the scrubber and gas cleaner apparatus, the operator has the choice of using a liquid or a gaseous coolant and may select the temperature of the coolant fluid at the inlet port and also its rate of flow through shell 120. Thus, as it indicated below is contemplated that in preferred practice such precooling will generally involve the use of water, but for some situations air is a suitable alternative, as are other liquids and gases and mixtures which are not corrosive to the precooler unit or otherwise detrimental to the purposes of this invention.

Scrubber 104 comprises a cylindrical shell 105 having an inlet port in its lower side wall, shell 105 being disposed with its axis vertical, as shown, and having an outlet port at the top for discharge of cooled and scrubbed gas into flue segment 114 for delivery into gas cleaner 106. In the upper portion of shell 105 a plurality of ports are provided for delivery of fresh and clean water as sprays. These ports are arranged in two vertically spaced rows and between the ports in the shell a first mesh-type mist eliminator 105M is positioned.

In the sump or lower portion of shell 105, discharge ports are provided in the side wall for drawing off liquid or liquid and solid mixtures collecting in the sump through line 107 for treatment or for discharge to a sewer (not shown). Another port in the shell side wall in the sump section enables withdrawal from the sump of liquid for delivery by line 108 into the shell upper portion below mist eliminator 105M.

Finally, treatment for neutralizing acidity of the waste gas flowing through the scrubber 104 is provided in the form of an alkali source 109 and a line 110 connecting the sump to the waste gas inlet port region of shell 105 for introduction of alkali of choice as liquid sprays into the waste gas stream at the rate necessary to maintain or adjust the pH of the waste gas in scrubber 104 to a predetermined level. Adjustment of the rate of delivery of alkali into the waste gas flow may be by manual or automatic operation of gear pump 110A.

Figure 14:
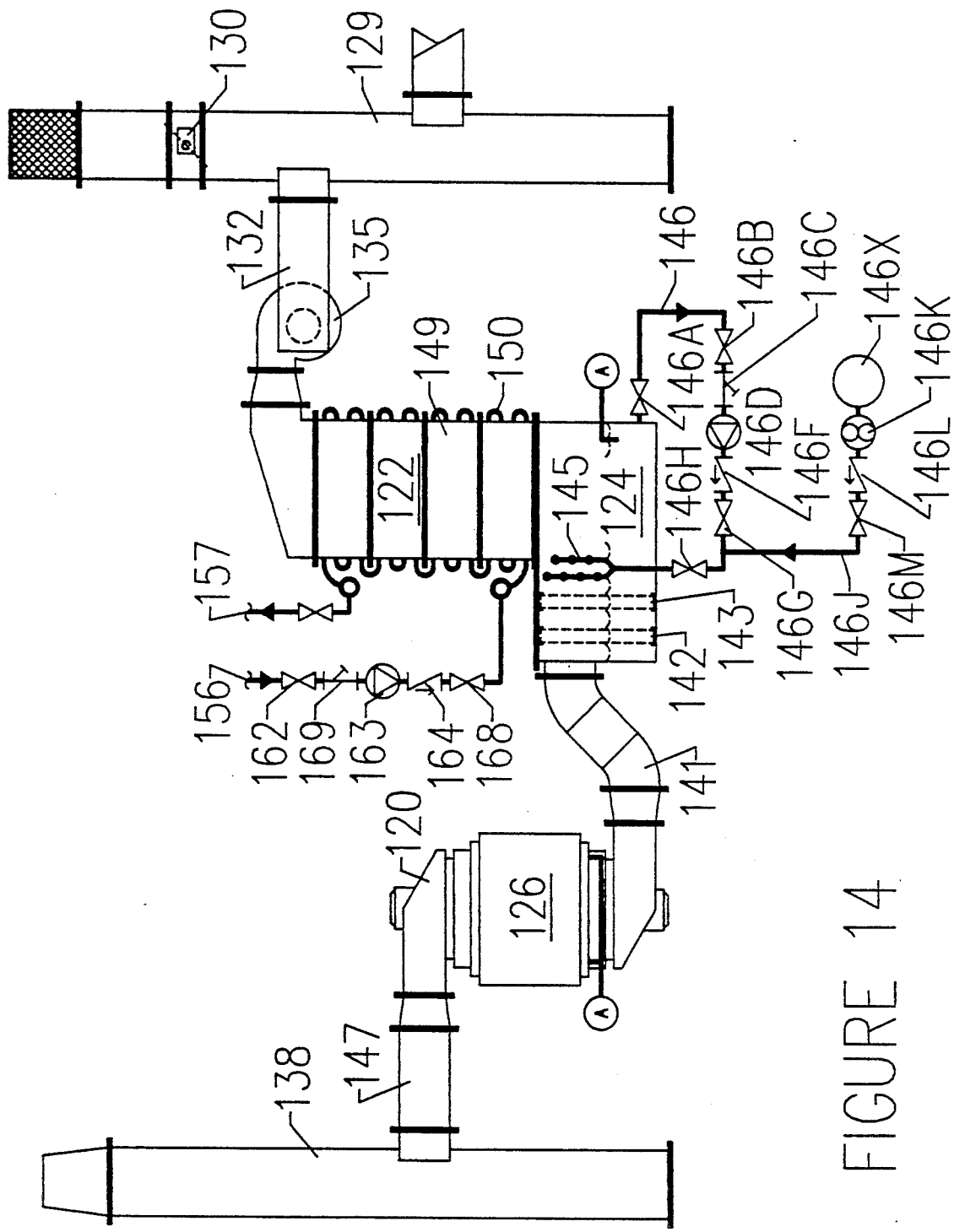
FIG. 14 is a view like that of FIG. 13 of another gas discharge system of this invention in which gas cooling involves waste gas - liquid heat exchange.

Gas discharge system 120 shown in FIG. 14 comprises a gas precooler 122, scrubber apparatus 124 and cleaning apparatus 126. System 120 is connected to a waste gas source (not shown) from which waste gas is discharged into a stack 129 having a damper valve 130 for closing the stack and diverting waste gas flow into the system 120 through flue 132 and a centrifical fan 135 serving to draw the waste gas from stack 129 and force it into and through precooler 122, scrubber 124, cleaning apparatus 126 and into stack 138 from which it is discharged to the atmosphere, cleaned and cooled. The flow of gas from scrubber 124 to cleaning apparatus 126 and is through flue segment 141 and flow from scrubber apparatus 126 to stack 142 is through flue segment 147.

Precooler apparatus 122 comprises a cylinder 149 open at its ends and a cooling coil 150 disposed in cylinder and connected to a reservoir of cooling fluid (not shown) by inlet and outlet lines 156 and 157. Cooling liquid, suitably water, thus is delivered to coil 150 through line 156 as gate valve 162 is opened and pump 163 is energized, check valve 164 being open and gate valves 162 and 168 being open that the water flows through strainer 169 and the coil is steadily supplied with flowing water which is returned to the reservoir with gate valve 170 being open. If desired, heat carried by water discharged from coil 150 is recovered prior to return to the reservoir for reuse in the cooling operation.

Scrubber apparatus 124 like that of the system of FIG. 13 is a cylinder which has a sump accumulation section in its lower portion, but unlike scrubber 104 it is disposed horizontally and has an intake port on its top side and an exhaust port at one end for receiving cooled waste gas from precooler 122 and dicharging scrubbed, cooled gas into flue segment 141 and then into the gas cleaner apparatus 126. Scrubber apparatus 124 is equipped with two demisters 142 and 143 through which waste gas must pass in travel to scrubber exhaust port and also is provided with spray head arrays 145 for delivering spray into waste gas traveling through the scrubber and approaching the demister assembly. The spray heads of array 145 are provided with water by a line 146 which is connected to the scrubber lower portion for drawing water from the sump through gate valves 146A, 146B and 146C and strainer, a pump 146D being provided to draw the water through the line and pump it through a check valve 146F and gate valves 146G and 146H into spray array 145. Alkali is delivered into the water traveling through line 146 between gate valves 146G and 146H by a gear pump 146 and a line 146J which connects an alkali supply 146 through a check valve 146L and a gate valve 146M. The acidity of the waste gas is thus treated by spray water bearing alkali of choice in amount to effect neutralization to the extent desired as waste gas travels through the scrubber apparatus. Drainage from gas cleaning apparatus 106 is delivered into the sump of scrubber apparatus 124 through line A.

Cleaning apparatus 126 which receives the cooled and scrubbed gas from flue segment 141 is preferably that of this invention as shown in FIG. 1 and described in detail above. It will be understood however, that alternative apparatus may be used for this gas cleaning function as described above and that this gas discharge system of this invention is not limited to the use of a particular gas cleaner any more than it is to a particular precooler or scrubber apparatus, but rather is generally the combination of those several elements and their functions.

Figure 15:
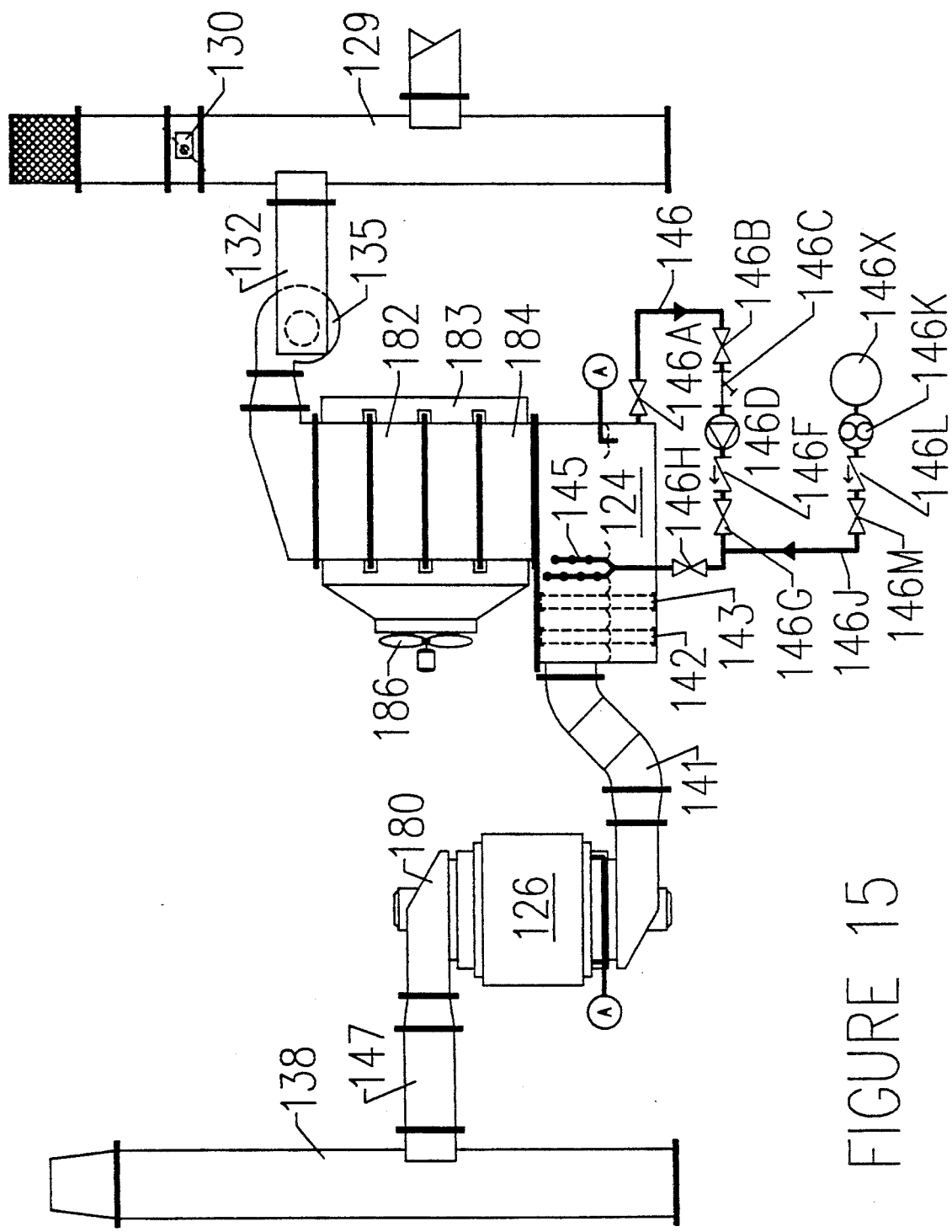
FIG. 15 is another schematic view of a gas discharge system of this invention in which gas cooling involves blowing ambient air in indirect heat exchange contact with stack gas and in which heat recovery is not effected.

Gas discharge system 180 of FIG. 15 is quite similar to system 120 of FIG. 14, differing essentially only in the precooler apparatus 182 which, instead of having a liquid cooling coil and a heat recovery alternative feature, involves only the use of ambient air blown through a jacket 183 surrounding the cylinder 184 comprising the main body of precooler apparatus 182. This air-to-gas indirect heat exchange is accomplished by a blower 186 delivering air in constant flow through an intake port in jacket 183 and out of the atmosphere through an exhaust port in the opposite side of the jacket. The remaining components of system 180 are identified by the reference characters applied to the same components as those of system 120 of FIG. 14, as described above.

Figure 16:
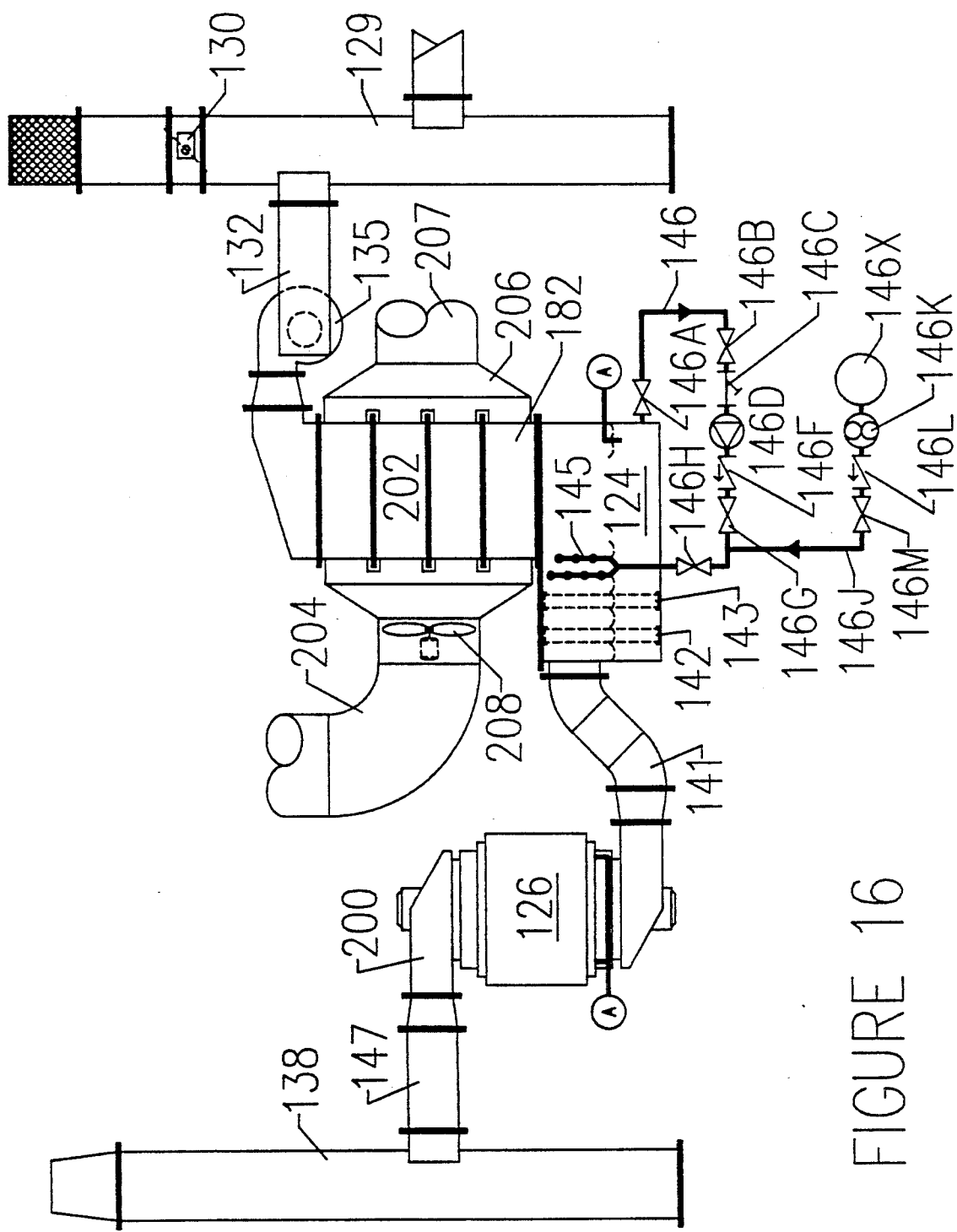
FIG. 16 shows a gas cleaning system of this invention in which gas cleaning is accomplished by apparatus involving cooling of stack gas in the first stage of treatment by indirect contact of the gas stream with flowing gas which is used in heat recovery operations.

Now referring to FIG. 16, gas discharge system 200 is again very similar to that of FIG. 15, the principal difference consisting of a recirculating feature which involves recovering heat from the cooling gas flowing in a closed circuit between precooler apparatus 202 and a heat recovery facility (not shown). Thus, a cooling gas or air is drawn through a delivery line 204 and forced into and through a jacket 206 and out through exhaust line 207 by a blower 208 which is operated continuously or intermittently as precooler function is required in the operation of system 200. Again, common parts of systems 200 and 180 are identified by the same reference characters.

Figure 17:
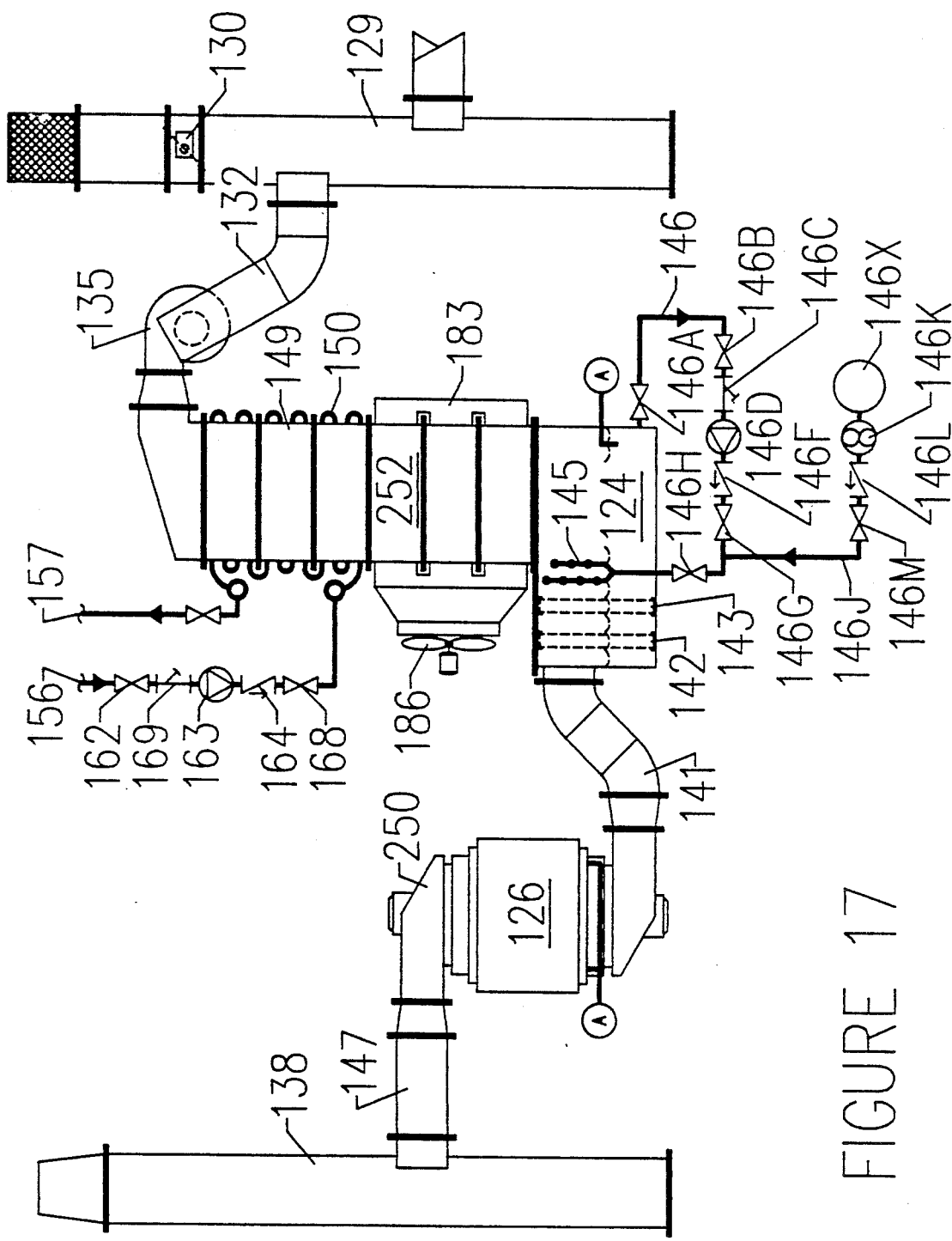
FIG. 17 is still another schematic view of a gas discharge system of this invention incorporating gas cooling features and functions of the apparatus of FIGS. 14 and 16 used together or in the alternative.

In FIG. 17, a gas discharge system 250 is illustrated which is a combination of the apparatus of FIGS. 14 and 15. Thus the precooler apparatus 252 incorporates both cooling coil 150 and recirculation arrangement of FIG. 14, as described above, and the air cooling assembly including jacket 183 and blower 186 as described above. The reference characters of system 250 are those applied to the same parts as those of the systems of FIGS. 14 and 15. In operation, system 250 affords the choice of using either the cooling coil or the air cooling feature, or both, if necessary to accomplish the desired result.

Figure 18:
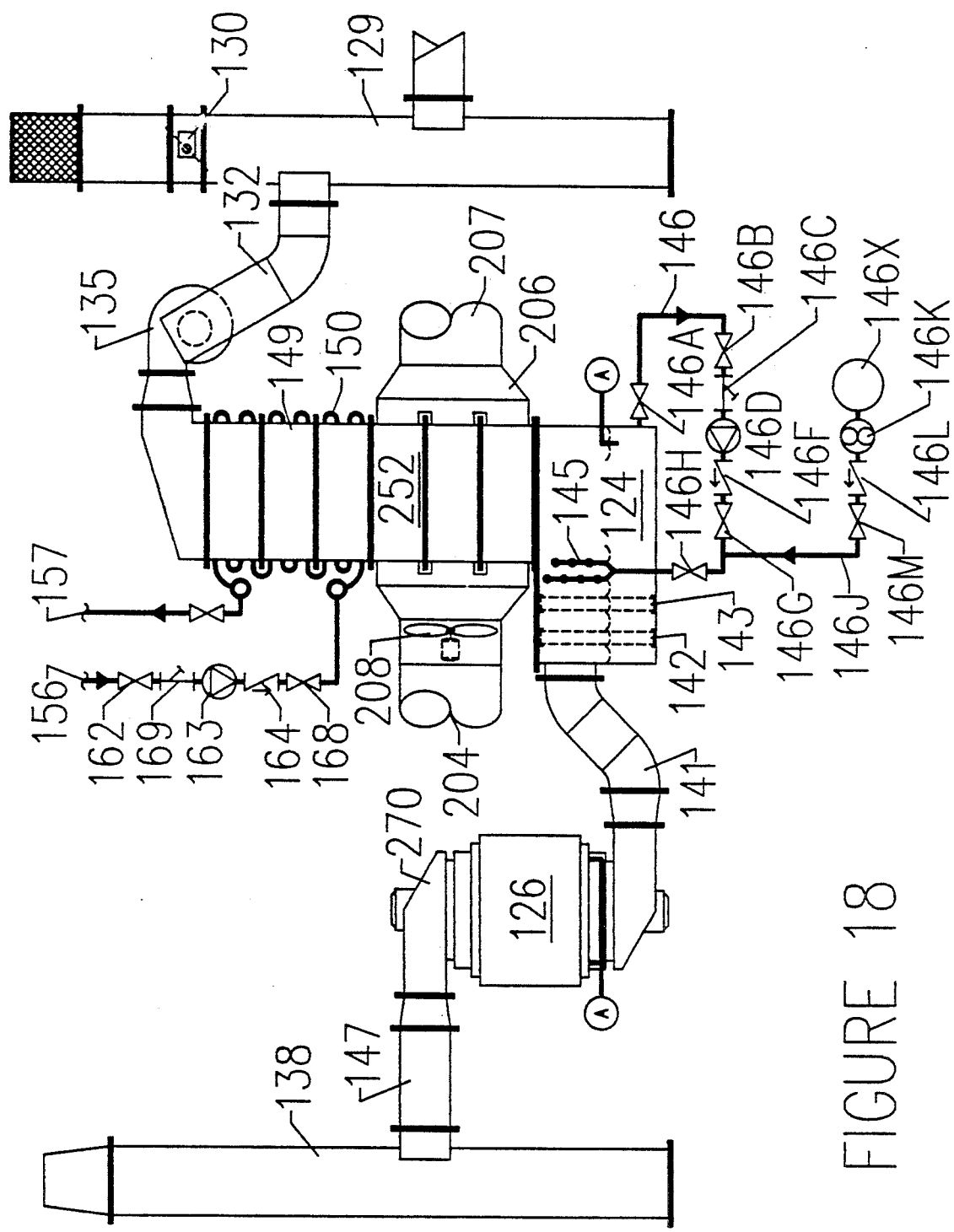
FIG. 18 is a schematic view of gas discharge of the apparatus of this invention in which the gas cooling features and functions of the apparatus of both FIG. 14 and that of FIG. 15 are combined for use together or in the alternative in the operation of the equipment.

Gas discharge system 270 of FIG. 18 is like that of FIG. 17 in that it incorporates a combination precooler apparatus 272 affording the alternatives like those of the apparatus of FIG. 17. The FIG. 18 apparatus, however, includes a gas precooler 182 of the FIG. 16 apparatus type in combination with the cooling coil 150 of FIG. 14. Again, as in the foregoing description, components and parts of apparatus common to apparatus described above are identified by the same reference characters.

Figure 19:
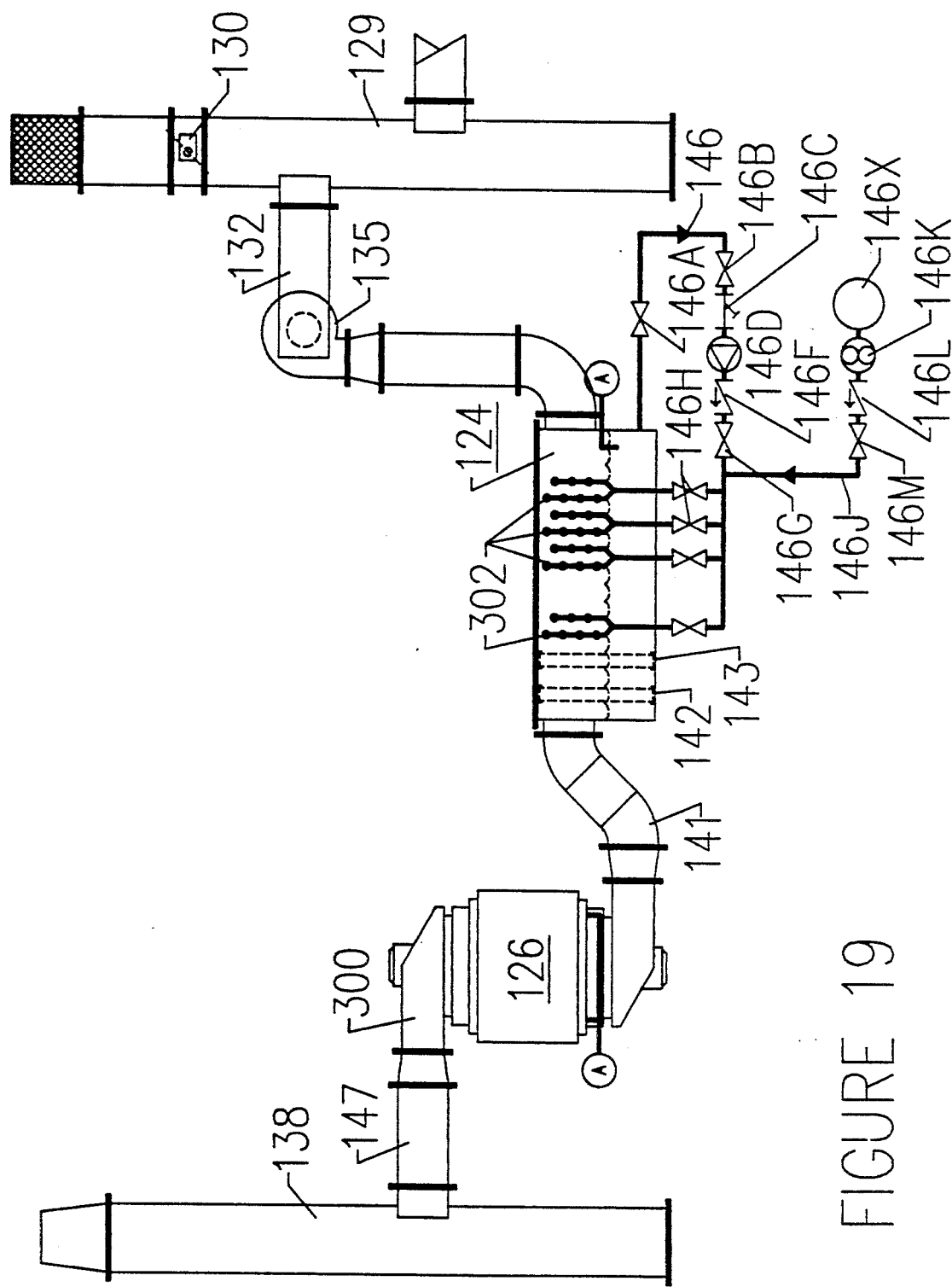
FIG. 19 is a schematic view of still another apparatus of this invention which consists only of particulate material separation apparatus and gas cleaning apparatus but incorporates a substantially greater spray generating capacity for waste gas cleaning and cooling effect.

The embodiment of this invention illustrated in FIG. 19 differs from the gas discharge systems of FIGS. 13-18 in two main respects. In the first place gas discharge system 300 does not include a separate precooler apparatus, waste gas being delivered directly from by centrifugal fan 135 and flue segment into scrubber apparatus 124. Secondly, the scrubber apparatus incorporates four separate arrays 302 of spray heads for treatment of waste gas traveling through scrubber 124 so that the gas as it reaches demisters 142 and 143 and the exhaust port of the scrubber is adequately cooled and scrubbed free of particulate material and neutralized as a result of alkali delivered into the spray head supply line 146. Spray head arrays 302 are served by pump 146K and alkali supply source 146X. Otherwise, system 300 of FIG. 19 is the same as the gas discharge systems of FIGS. 14-18 and apparatus and components of the FIG. 19 system common to those other systems are indentified by the same reference characters.

In this specification and in the appended claims, where ratio, percentage or proportion are stated, reference is to the weight basis unless otherwise specified.

I claim:

1. In the method of separating and removing particulate material and oxides of sulfur and nitrogen from stack gases which comprises the steps of flowing the gases through an array of rotating separating wheels in a gas flow duct while delivering water spray into the flowing gases in the wheel array, the combination of the steps of establishing and maintaining a plurality of liquid reservoirs within the wheel array, and substantially uniformly discharging accumulated liquid from the reservoirs radially outwardly across the rotating separating wheels.

2. The method of claim 1 including the steps of collecting liquid discharged from the wheels, recirculating the collected liquid, monitoring the pH of the recirculating liquid and adding alkali to maintain the pH of the recirculating liquid at a level in a predetermined pH range.

3. The method of claim 1 in which liquid is discharged substantially continuously uniformly and radially from each reservoir.

4. The method of claim 1 in which the reservoirs are each established and maintaining in proximity to a separating wheel axis.

5. A method of cleaning combustion gas which comprises the steps of flowing combustion gas in indirect heat exchange relation with another fluid thereby cooling the gas to a predetermined temperature level, then introducing the cooled gas into gas cleaning apparatus and removing contaminants from the gas, and finally discharging the resulting cleaned cooled gas to the atmosphere.

6. The method of claim 5 including the step of flowing the cooled gas into contact with a liquid spray and thereby removing particulate material entrained in the gas, and thereafter introducing the cooled gas into the gas cleaning apparatus.

7. The method of claim 6 including the step of regulating the alkalinity of the liquid spray and thereby neutralizing the acidity of the gas.

8. The method of removing gaseous and solid contaminants from combustion gas stream which comprises steps of flowing the gas stream in heat exchange relation to another fluid and thereby cooling the gas to a predetermined temperature level, flowing the cooled gas through an array of open rotating separating wheels while delivering water sprays into the wheel array, maintaining liquid reservoirs within the wheel array, and continuously discharging accumulated liquid from the reservoirs radially outwardly along spokes the rotating separating wheels.

9. The method of claim 8 including the step of flowing the cool gas in contact with a liquid spray and thereby removing particulate material entrained in the gas prior to introducing gas into the separating wheel array.

10. The method of claim 9 including the step of regulating the alkalinity of the liquid spray and thereby neutralizing the acidity of the gas before introducing the gas into the wheel array.

11. In a gas cleaning apparatus effective to extract and remove particulate material, moisture and oxides of sulphur and nitrogen from stack gases, including a generally cylindrical housing having inlet and outlet ports, a separating device rotatably mounted in the housing comprising a plurality of air purification wheels each of which has a hub and a plurality of spaced radially-extending spokes secured to the hub, in combination a liquid spray delivery means including a conduit having atomizing discharge ports adjacent to the wheels and liquid recirculation means including a spray drain collection vessel and a pump connected to the conduit to transfer liquid contents of the vessel to the conduit, and liquid spray pH control means comprising a pH sensor disposed for contact with the recirculating liquid.

12. The apparatus of claim 11 including alkali delivery means including an alkali supply vessel connected to the spray drain collection vessel and metering means operatively associated with the pH sensor for controlling flow of alkali into liquid in the collection vessel.

13. Gas cleaning apparatus effective to extract and remove particulate material, moisture and oxides of sulphur and nitrogen from stack gases, including a tubular gas flow duct, a separating device rotatably mounted in the duct comprising a plurality of air purification wheels each of which has a hub and a plurality of spaced radially-extending spokes secured to the hub, drive means including a motor having a hollow drive shaft, extending coaxially through the wheel hubs and a pipe connected to the motor drive shaft to receive liquid therefrom and having liquid spray discharge ports along its length for delivering liquid under pressure into the hollow drive shaft and the pipe while the separating device is rotating, the hub of each wheel having a depressed portion in its upper side to receive and contain and discharge liquid to spokes of its wheel during operation of the apparatus.

14. The apparatus of claim 13 in which each wheel hub has an axial aperture to receive the pipe.

15. In a gas cleaning apparatus effective to extract and remove particulate material, moisture and oxides of sulphur and nitrogen from stack gases, including a tubular gas flow duct, a separating device rotatably mounted in the duct comprising a plurality of air purification wheels each of which has a hub and a peripheral rim radially spaced from and rotating with the hub, and drive means for rotating the wheels, in combination of a plurality of spokes of generally air foil shape secured at their ends to the hub and rim, each of the spokes having a leading edge and a trailing edge and having a longitudinally-extending reentrant cavity in the trailing edge to collect moisture and to discharge wet accumulation over the rim ring as the separating device is rotated, the surface portion of each spoke defining the reentrant cavity being of moisture-retaining roughness.

16. The apparatus of claim 15 in which the reentrant cavity-defining portion of the spoke in each instance is coated with Teflon plastic material.

17. The apparatus of claim 15 in the surface portion of each spoke defining the reentrant cavity is coated with Pyroceram ceramic material.

18. The apparatus of claim 15 in which the spokes are of metal and the surface portion of each spoke defining the reentrant cavity therein is coated with silicon carbide bonded to the spoke metal.

19. The apparatus of claim 15 in which the spokes are all of substantially uniform-cross sectional size and shape, and in which the spokes of each air purification wheel are uniformly spaced around the periphery of the rim ring and hub and disposed with their leading edges facing in the same direction.

20. The apparatus of claim 19 in which each spoke is positioned slightly tilted with its lower side substantially parallel to the plane of its wheel.

21. The apparatus of claim 15 in which each hub is a metal disk having a relatively small axial aperture and having a central portion depressed relative to the plane of the disk for accumulation of moisture and distribution of liquid substantially uniformly to the spokes secured to each hub.

22. Gas cleaning apparatus for extracting and removing particulate material, moisture and oxides of sulfur and nitrogen from power generation combustion gases and inductrial gaseous effluents comprising a generally cylindrical housing having inlet and outlet ports at its ends, a separating device mounted in the housing comprising a first assembly of coaxially disposed rotatable air purification wheels, a second assembly of coaxially disposed rotatable air purification wheels interleaved with and spaced from wheels of the first assembly, a first drive means for rotating the wheels of the first assembly together in a first direction, and a second drive means for rotating the wheels of the second assembly together in a second direction counter to the first direction.

23. The apparatus of claim 22 in which the wheels of the first assembly each have a disc-like hub with an axial aperture, and in which the first drive means includes a first motor in fixed position in the housing and in driving engagement with each wheel.

24. The apparatus of claim 23 in which the wheels of the first assembly are supported and driven by the first motor and a louver wheel and louver flange secured to the first motor drive shaft and a plurality of stag bolts secured to the louver wheel and to the hub of each first assembly wheel.

25. The apparatus of claim 22 in which the wheels of the second assembly are supported and driven by a second motor and a main support wheel secured to the second motor and to the wheels of the second assembly for rotation therewith.

26. The apparatus of claim 22 including second wheel assembly support means comprising an outer ring secured to a peripheral portion of each second wheel, a band secured to each outer ring and each band being attached to an adjacent band to provide a unitary structure, and a support wheel secured to the band unitary structure for rotation therewith.

27. In a gas discharge system including a flue to receive effluent waste gas and a stack to receive gas from the flue for discharge from the system, the combination of gas cleaning apparatus and gas precooler apparatus upstream from the gas cleaning apparatus to cool gas flowing to the gas cleaning apparatus.

28. The apparatus of claim 27 including separation apparatus between the precooler apparatus and the gas cleaning apparatus for removing particulate material from gas flowing from the precooler apparatus.

29. The apparatus of claim 27 in which the precooler apparatus comprises a jacket fitted on the flue and having inlet and outlet ports for receiving and discharging cooling fluid flowing through the jacket in heat exchange contact with the flue.

30. The apparatus of claim 28 in which the separating apparatus comprises spray header means to deliver liquid sprays into the gas stream flowing between the precooler apparatus and the gas cleaning apparatus.

31. The apparatus of claim 30 in which the header means includes a fresh water spray nozzle array and an alkaline liquid spray nozzle array.

32. The apparatus of claim 31 including demister means comprising a first mist eliminator downstream from the alkaline spray nozzle array and a second mist eliminator downstream from the fresh water nozzle array.

33. The apparatus of claim 27 in which the gas cleaning apparatus comprises a generally cylindrical housing having gas inlet and outlet ports at its ends, a separating device rotatably mounted in the housing comprising a plurality of air purification wheels having radially disposed spokes, drive means including a motor for rotating the wheels, and liquid spray discharge means for delivering liquid spray onto the wheels, each said wheel having a hub with a depressed portion in its upper surface to receive and contain and discharge liquid to wheel spokes during the operation of the apparatus.

* * * * *